(12) United States Patent
Stephenne

(10) Patent No.: US 8,095,185 B2
(45) Date of Patent: Jan. 10, 2012

(54) ESTIMATION OF ANGULAR PARAMETERS OF A SIGNAL AT AN ANTENNA ARRAY

(75) Inventor: Alex Stephenne, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1553 days.

(21) Appl. No.: 11/449,706

(22) Filed: Jun. 9, 2006

(65) Prior Publication Data
US 2007/0287385 A1    Dec. 13, 2007

(51) Int. Cl.
    *H04M 1/00*      (2006.01)

(52) U.S. Cl. .................. 455/562.1; 455/67.11; 455/561; 342/359; 342/360

(58) Field of Classification Search ............... 455/67.11, 455/80, 561, 562.1; 342/359, 360, 378, 382, 342/383
See application file for complete search history.

(56) References Cited

U.S. PATENT DOCUMENTS

| | | | | |
|---|---|---|---|---|
| 5,343,210 | A * | 8/1994 | Marcuard | 342/352 |
| 5,973,638 | A | 10/1999 | Robbins et al. | 342/172 |
| 6,236,363 | B1 * | 5/2001 | Robbins et al. | 342/360 |
| 6,483,459 | B1 | 11/2002 | Hou et al. | 342/378 |
| 6,728,294 | B1 * | 4/2004 | Kohno et al. | 375/133 |
| 6,985,106 | B2 * | 1/2006 | Kawasaki | 342/378 |
| 7,457,590 | B2 * | 11/2008 | Frank | 455/69 |

FOREIGN PATENT DOCUMENTS

| | | |
|---|---|---|
| GB | 2 362 295 A | 11/2001 |
| WO | 00/35129 | 6/2000 |

OTHER PUBLICATIONS

Tõnu Trump et al.: "Estimation of Nominal Direction of Arrival and Angular Spread Using an Array of Sensors"; Royal Institute of Technology, Department of Signals, Sensors & Systems, Signal Processing; Apr. 25, 1996.
Richard B. Ertel et al.: "Overview of Spatial Channel Models for Antenna Array Communication Systems"; IEEE Personal Communications; Feb. 1998.

(Continued)

*Primary Examiner* — Tuan H Nguyen
(74) *Attorney, Agent, or Firm* — Ericsson Canada Inc.

(57) ABSTRACT

A method and an antenna array system are provided for estimating parameters of radio signals impinging on antenna arrays, for estimating angular parameters, for estimating angular distribution types, and for selecting types of antenna array processing. Models of angular distribution types are used to populate look-up tables. Correlation magnitudes and correlation phases of signals impinging on antenna elements of antenna arrays are used as pointers to obtain values of parameters from the look up tables. The obtained values may be compared to some value ranges in order to select appropriate antenna array processing types. Where the angular distribution type is unknown, several values representing angular parameters may be obtained from look-up tables representing various models, and a variance of the angular parameter values for each model may be calculated. A low variance obtained from a look-up table is indicative that the model used to populate the look-up table is a good representation of the actual channel. In a network comprising a first node incorporating an antenna array and a second node, the first node may inform the second node about the type of signal distribution of the channel. This information is used by the second node to select the antenna processing type.

25 Claims, 16 Drawing Sheets

OTHER PUBLICATIONS

B. Ottersten et al.: "Covariance Matching Estimation Techniques for Array Signal Processing Applications"; Royal Institute of Technology, Department of Signals, Sensors & Systems, Signal Processing; Jul. 1998.

Mats Bengtsson et al.: "Low-Complexity Estimators for Distributed Sources"; IEEE Transactions on Signal Processing; vol. 48, No. 8, Aug. 2000.

Hatem Boujemaa et al.: "Joint Estimation of Direction of Arrival and Angular Spread Using the Knowledge of the Power Angle Density"; IEEE; Jun. 7, 2002.

Mikael Tapio: "On the Use of Beamforming for Estimation of Spatially Distributed Signals"; Department of Signals & Systems, Chalmers University of Technology, Sweden; ICASSP 2003; Hong Kong, China.

Yuanwei Jin et al.: "Detection of Distributed Sources Using Sensor Arrays"; IEEE Transactions on Signal Processing, vol. 52, No. 6; Jun. 2004.

Nima Khajehnouri et al.: "Adaptive Angle of Arrival Estimation for Multiuser Wireless Location Systems"; 5th. IEEE Workshop on Signal Processing Advances in Wireless Communications, Lisboa, Portugal, Jul. 11-14, 2004.

* cited by examiner

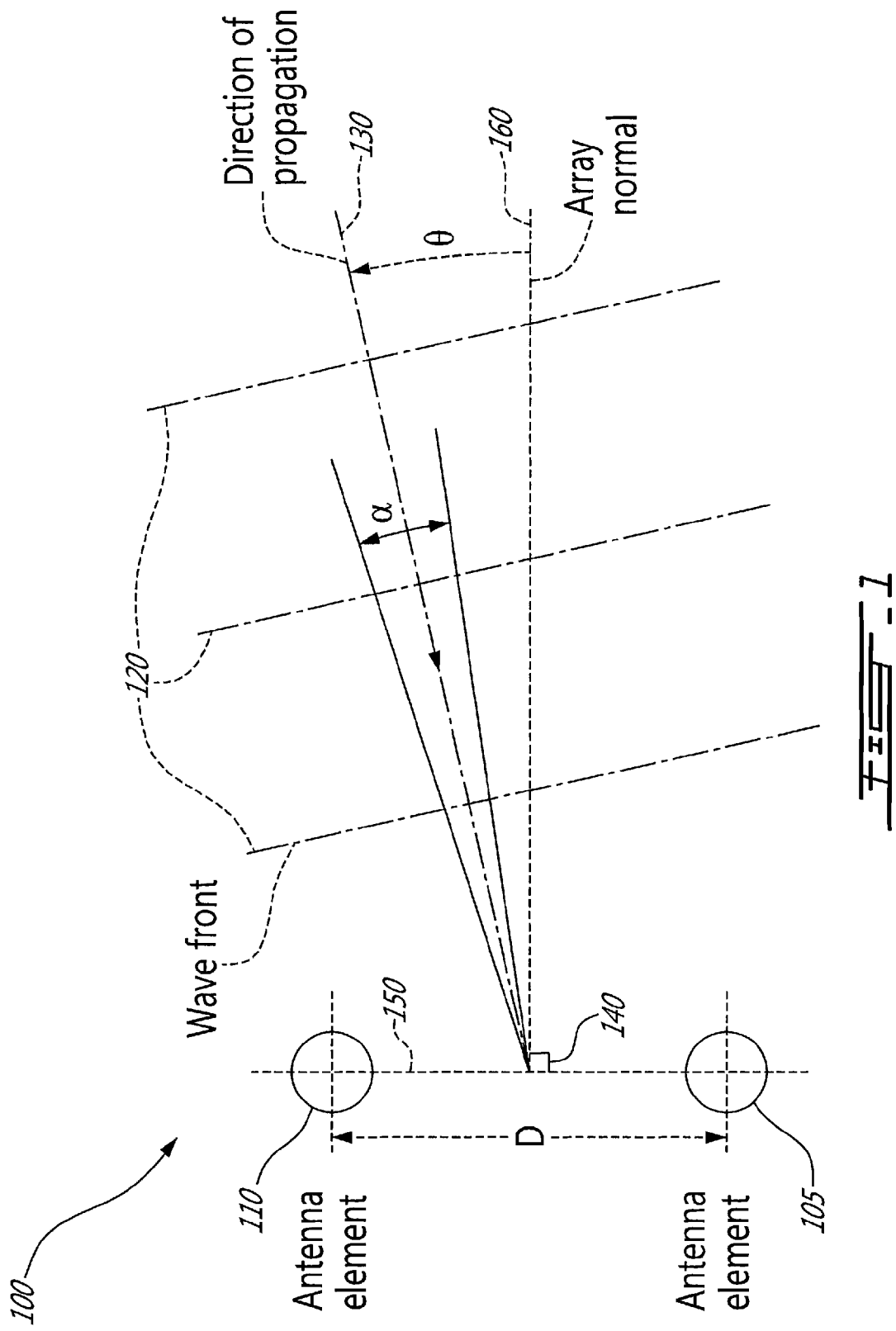

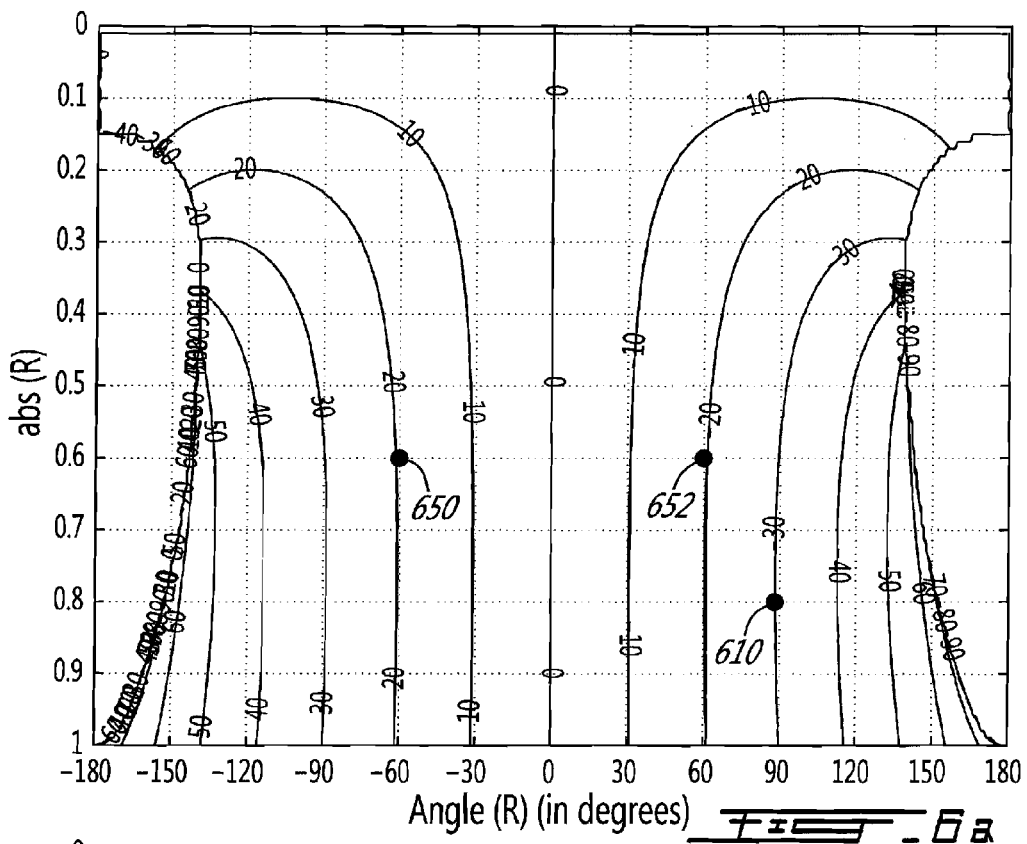
FIG_6a
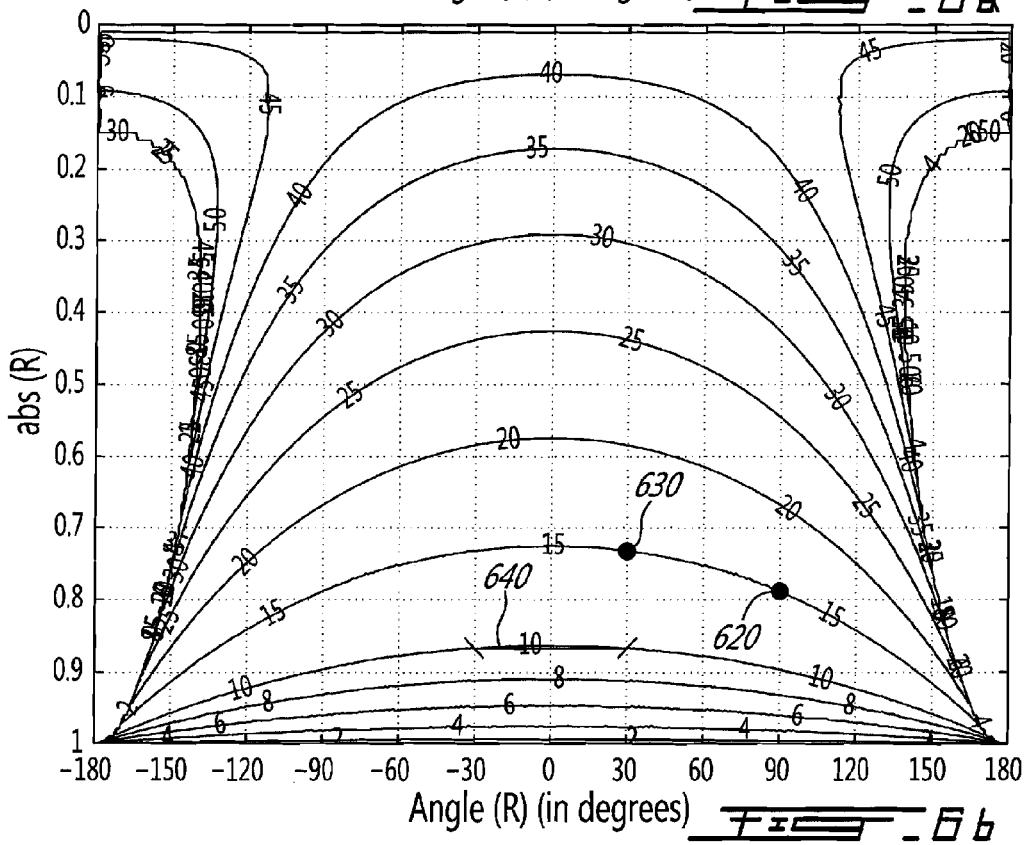
FIG_6b

|  | 0.0 | 0.2 | 0.4 | 0.6 | 0.8 | 1.0 |
|---|---|---|---|---|---|---|
| -90 | — | 40 | 31 | 23 | 14 | 2 |
| -60 | — | 36 | 28 | 20 | 13 | 2 |
| -30 | — | 34 | 27 | 18 | 12 | 2 |
| 0 | — | 33 | 26 | 17 | 12 | 2 |
| 30 | — | 34 | 27 | 18 | 12 | 2 |
| 60 | — | 36 | 28 | 20 | 13 | 2 |
| 90 | — | 40 | 31 | 23 | 14 | 2 |

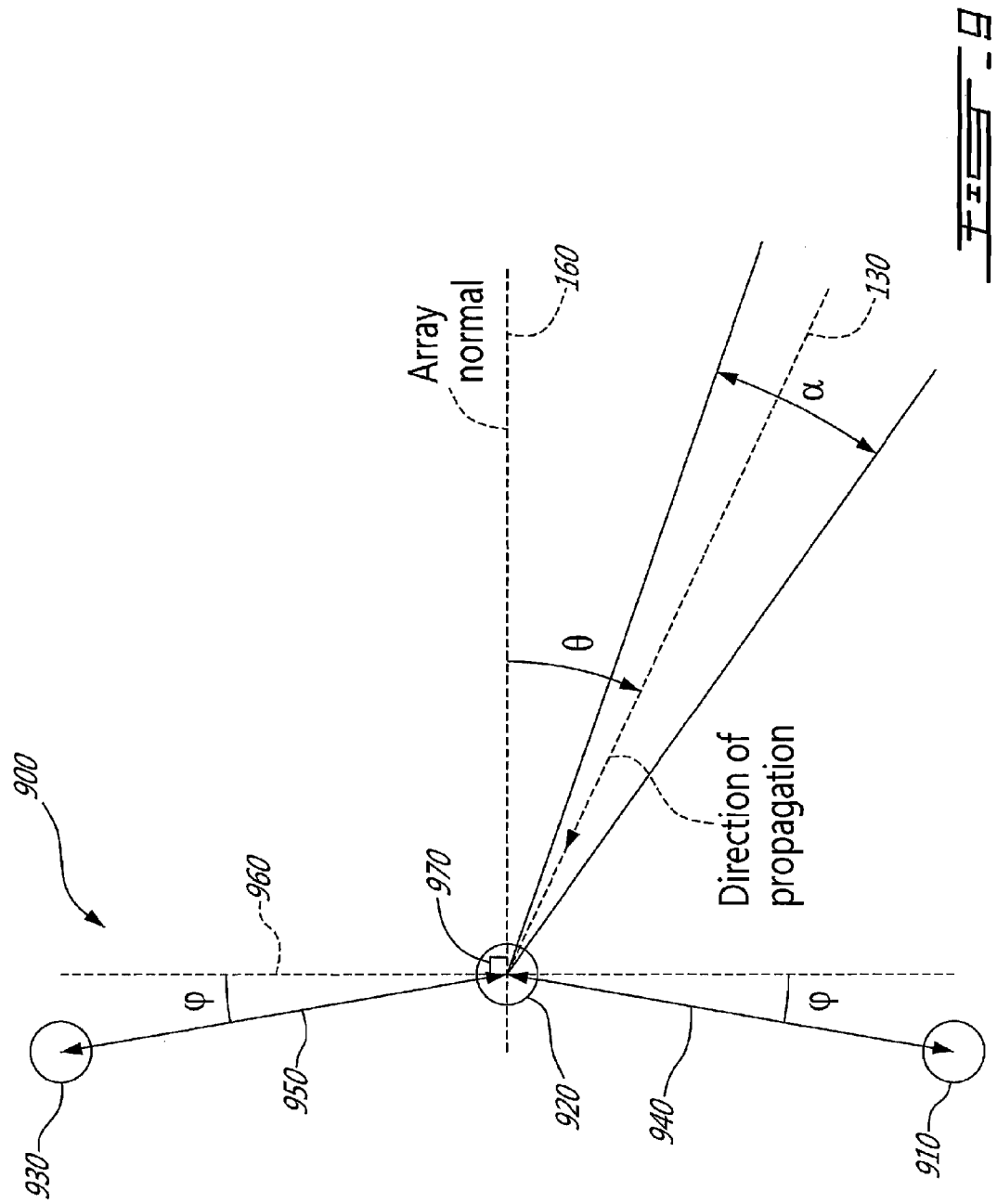

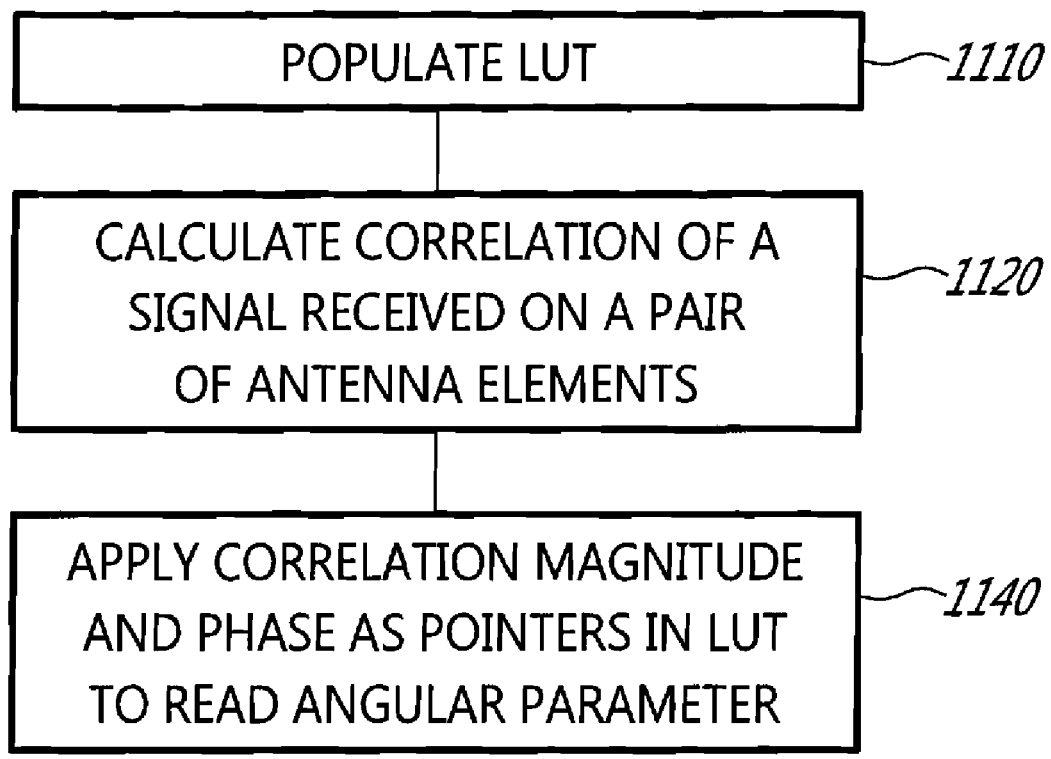

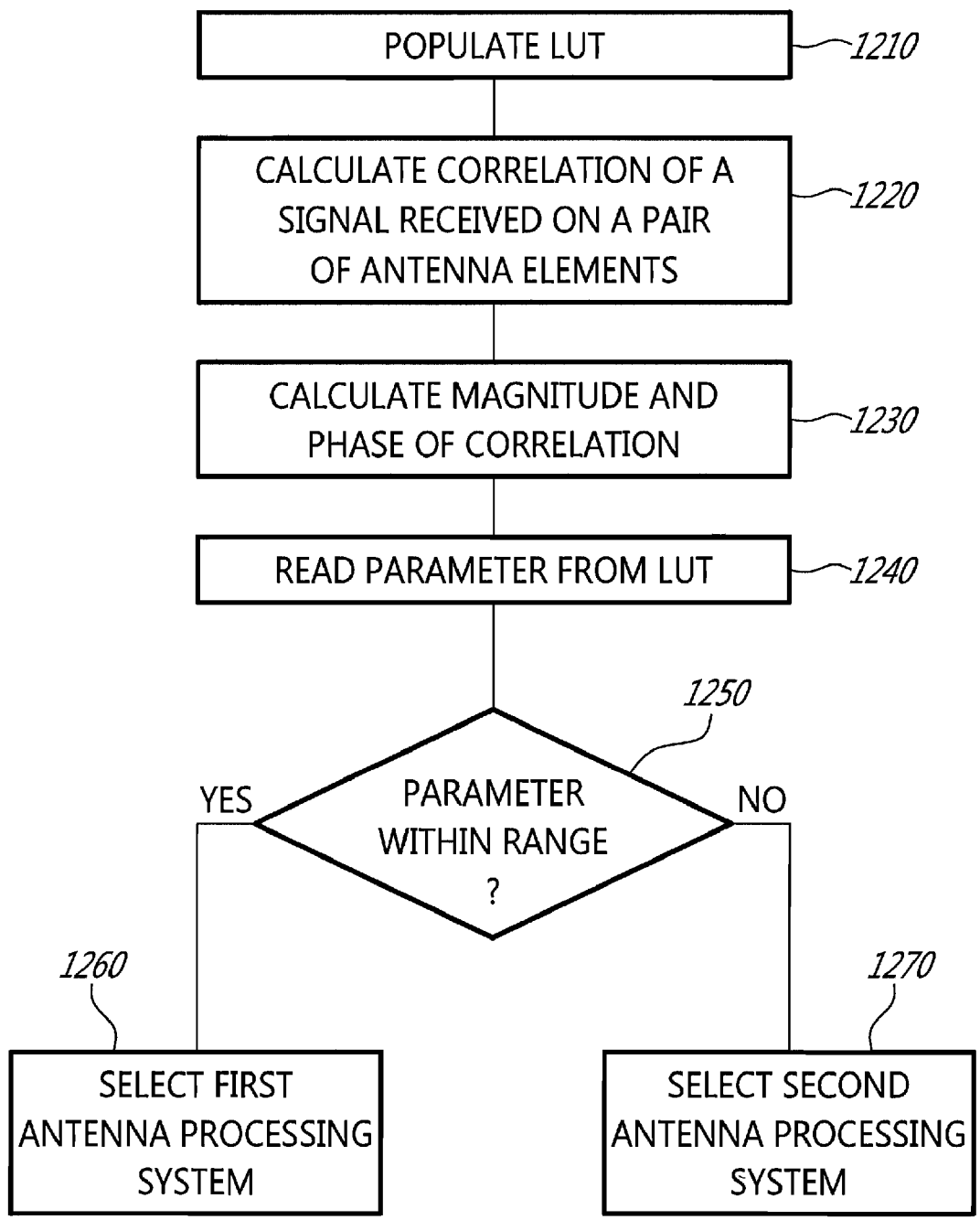

ESTIMATION OF ANGULAR PARAMETERS OF A SIGNAL AT AN ANTENNA ARRAY

BACKGROUND OF THE INVENTION

1. Field of the invention

The present invention relates to a method, and an antenna array system, for supporting estimation of angular parameters of signals received at an antenna array.

2. Description of the Related Art

An antenna system may comprise one or more antenna elements. In many cases, the antenna system is directional, in the sense that it provides good reception of a radio signal from a range of angles of arrival. Well-known wireless cellular systems oftentimes use three antennas, or preferably three pairs of antennas, within one cell site, each antenna or pair covering substantially 120 degrees of range, the three antennas or pairs altogether providing a full circular receiving range. A directional antenna generally provides more receiving gain than an unidirectional antenna, but this is true only for signals with an angle of arrival (AOA) that falls within its designed angular range. Signals that arrive outside of the designed angular range of the directional antenna are highly attenuated and, to a large extent, ignored. Those signals would normally be received by another directional antenna, or directional antenna pair, within the same cell site, providing coverage over its own angular range.

A same radio signal may arrive at an antenna system having gone through a channel wherein scatterers have caused the signal to propagate in various directions. As a result, several copies of the same signal arrive at the antenna system from various angles, in a range known as Angular Spread (AS), which is a measure of how much a signal has been scattered in a way that causes it to arrive at the antenna system over a broad angular range, and with various delays. Copies of the same signal may arrive in phase, or out of phase, at an antenna element. When copies of the same signal arrive out of phase, they may subtract from one another, causing fading, an important but generally temporary attenuation of the signal.

FIG. 1 shows two antenna elements 105 and 110 of an antenna array system 100. The antenna elements 105 and 110 are separated by a distance D. The distance D is commonly set equal to one half of the wavelength of a radio signal that is intended to be received. For example, if the signal is a cellular radio signal in the 1900 MHz range, the distance D may be set equal to a half-wavelength, corresponding to approximately 8 centimeters. Sometimes, it is more practical to space antenna elements at an integer multiple of the half-wavelength of the radio signal. A signal impinging on the antenna elements, can be modeled as a wavefront 120, that is, a succession of radio waves. The main, general direction of propagation 130 of the wavefront 120 has an angle of arrival (AOA) 0, relative to a normal angle 140 between a linear direction 150 set by the antenna elements 100 and 110 and an array normal 160 thereto. The signal is further spread around the general AOA by an angular spread (AS) σ.

The AS of a signal arriving at an antenna array may indicate that the signal has been scattered in variety of manners, depending on the environment of the radio channel. Not only the spread of the AOA may be narrow or wide, but the spread may have various types of angular distributions. The most commonly used models for angular distribution of radio signals impinging on antenna arrays are the well-known Gaussian, Laplacian, or Uniform distributions. Accurate estimation of the AS of a signal requires a knowledge of the angular distribution type of the signal.

Next generation wireless cellular systems will use smart antenna techniques to increase throughput, cell radius and capacity. There exist in the prior art multiple smart antenna techniques such as beamforming, antenna diversity and spatial multiplexing. These techniques use antenna arrays, that is two or more antenna elements used to receive multipath signals. Generally, smart antennas attempt to overcome negative effects of multipath propagation of radio signals. They may also attempt, for instead in the case of beamforming antennas, to provide a higher receiving gain in the main direction of arrival (AOA) of a desired signal. Antenna diversity, wherein two antenna elements are designed to receive a same signal, attempt to combat fading by providing a high probability that, when a first antenna element receives the signal in a deep fade, the second antenna element receives the signal out of fade.

Any one of the current smart antenna techniques cannot be said to be superior to others for all considered transmission scenarios. For example, when a signal is received over a wide AS, beamforming over a narrow range in the direction of the AOA simply ignores a large part of the receivable signal. As a result, next generation system are expected to make use of multiple smart antenna processing techniques, switching from one technique to another, depending on space, time and frequency conditions. Those conditions need to be categorized and parameterized in order for processing systems attached to the antenna arrays to operate using a smart antenna technique that is appropriate for the conditions. Real-time selection of a smart antenna technique need to rely on an estimation of key channel parameters. One such likely key parameter is multipath AS. As an example, when the AS is relatively small and the AOA is known, beamforming is appropriate. When AS is large, other methods, such as antenna diversity, are more suitable.

In the prior art, procedures to allow for estimation of the AS are complex and require high processing capacities. As an example, Maximum Likelihood (ML) based approaches have been proposed, for example in "Detection of distributed sources using sensor arrays", Y. Jin and B. Friedlander, IEEE Transactions on Signal Processing, June 2004. A main disadvantage of ML based methods is that a multidimensional numerical search is necessary. Furthermore, the complexity of methods of a similar nature increases with a number of possible angular distributions to test, that is, such methods need to evaluate the AS for each of a Gaussian, Laplacian and Uniform distribution types. Covariance-matching estimators, also called generalized least squares methods, are also proposed, for example in "Covariance matching estimation techniques for array signal processing applications", B. Ottersten, P Stoica and R. Roy, Digital Signal Processing—A review Journal, July 1998. Covariance matching estimators, although less complex than ML-based estimators, still require multidimensional searches, or at least multiple unidimensional searches, and as such are still quite complex. Some form of these methods can be used without a priori knowledge of the angular distribution, at the cost of reduced estimation accuracy. Subspace-based methods ("Low complexity estimators for distributed sources", M. Bengtsson and B. Ottersten, IEEE Transactions on Signal Processing, August 2000), and beamforming-based methods ("On the use of beamforming for estimation of spatially distributed signals", M. Tapio, IEEE International Conference on Acoustics Speech and Signal Processing, April 2003), have also been developed.

A problem of the above methods is with regards to numerical complexity. Another problem is the fact that most of those methods require an a priori knowledge of the type of angular distribution. For the beamforming method, there is also a problem related with the selection of angular ranges over which a search is being done.

In another approach, the AOA and AS are estimated by use of a model using two point sources, and, from this model, closed-form expressions are obtained for a mean angle of arrival and for an angular spread, as a function of instantaneous received signals. A problem with this method is that a number of antenna elements must be greater than four, and obtained estimates are relatively precise only for low angular spreads, smaller than three degrees or so.

There would be clear advantages of having a method and an antenna array system that can, with real-time calculations of limited complexity, estimate angular parameters of a multipath signal, over a wide range of the angular parameters.

SUMMARY OF THE INVENTION

It is therefore a broad object of this invention to provide a method and an antenna array system for estimating angular parameters of a signal impinging on an antenna array. The method and the antenna array system use a table of values, also referred to as a look-up table, that contains pre-calculated data, and that is addressed based on real-time, low complexity correlations of the received signal.

A first embodiment of the present invention is directed to a method of estimating a parameter of a signal impinging on an antenna array. The method calculates relations between possible values of the parameter and correlation phase values, and stores the relations in a table. For a pair of antenna elements, the method calculates a correlation phase of the signal. The method then uses the correlation phase as a pointer to read the desired parameter from the table. Relations between possible values of the parameter and correlation phase values may additionally be calculated and stored in the table for a known angular distribution type, or for a worst-case of possible angular distribution types.

A second embodiment of the present invention is directed to the method of estimating a parameter of a signal impinging on an antenna array, wherein the method further comprises calculating further relations between possible values of the parameter and correlation magnitude values. The method stores the relations in a two-dimensional table. For a pair of antenna elements, the method calculates both a correlation magnitude and a correlation phase of the signal. The method then uses both the correlation magnitude and the correlation phase as pointers to read the desired parameter from the two-dimensional table. The parameter of interest may comprise, for example, an angular spread or a mean angle of arrival. In an alternate aspect of this embodiment, an antenna array processing type may be selected based on the resulting parameter.

A third embodiment of the present invention is directed to the method of estimating a parameter of a signal impinging on an antenna array, wherein the parameter of interest is a type of angular distribution. The antenna array used by the method preferably comprises a minimum of three (3) antenna elements, the antenna elements being placed in a nonlinear arrangement. The method defines two pairs of antenna elements considering at first two antenna elements, and then one of these two antenna elements with a third antenna element. The method calculates, for each pair, a correlation magnitude and a correlation phase for the signal measured at each pair of antenna elements. The method uses the correlation magnitudes and the correlation phases to address two two-dimensional tables. A first two-dimensional table comprises values of a parameter for a first angular distribution type. A second two-dimensional table comprises values of the same parameter, but this time for a second angular distribution type. Since correlation magnitudes and correlation phases are calculated for two pairs of antenna element, two parameter results are obtained from each two-dimensional table. A first variance is calculated for the parameter results based on the first angular distribution type, and a second variance is calculated for the parameter results based on the second angular distribution type. If the first variance is smaller than the second variance, it is concluded that the first distribution type is a better model of the channel than the second distribution type. The angular distribution types of interest may comprise, for example, Uniform, Laplacian, or Gaussian.

A fourth embodiment of the present invention is directed to the method of estimating a parameter of a signal impinging on an antenna array, wherein the parameter of interest is a correlation magnitude calculated according to a given angular parameter which may, for example, be a given angular spread or given angle of arrival. A correlation phase of the signal measured at a pair of antenna elements is calculated. The phase of the correlation is used to address a table. The method uses the correlation phase as a pointer to read, from the table, a correlation magnitude. The correlation magnitude read from the table is a minimum correlation magnitude for which a given type of antenna processing system is acceptable. The type of antenna processing is selected based on whether or not the correlation magnitude calculated for the signal is larger than the minimum correlation magnitude read from the table.

A fifth embodiment of the present invention is directed to the method of estimating a parameter of a signal impinging on an antenna array wherein the antenna array is implemented in a first node. The first node sends information about the parameter of the signal to a second node, and the second node uses information about the parameter received from the first node to select a type of antenna array processing. The parameter of interest may comprise, for example, an angular distribution type, an angular spread or a mean angle of arrival.

A sixth embodiment of the present invention is directed to an antenna array system comprising a set of antenna elements, a processing unit, and a memory. The processing unit calculates relationships between correlation phase values and signal parameter values. These relationships are used to populate a table in the memory. A signal of interest is received on at least one pair of antenna elements. The processing unit calculates a correlation phase of the signal. The resulting correlation phase is used as a pointer to read, from the table in the memory, the parameter of interest. In an alternate aspect, the processing unit further calculates relationships between correlation magnitude values and signal parameter values, and these relationships are also stored in the table. The processing unit also further calculates a correlation magnitude of the signal. Both the correlation magnitude and the correlation phase are used as pointers to read, from the table, the parameter of interest.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1 shows two antenna elements of an antenna array;

FIGS. 6(*a* and *b*) are representations of mean angle of arrival, and angular spread, as a function of channel correlation magnitudes and phases, for a Gaussian angular distribution;

FIG. 9 shows an antenna array with 3 antenna elements in a nonlinear arrangement;

FIG. 11 illustrates steps in a method for estimating an angular parameter;

FIG. 12 shows steps of an exemplary method for selecting a type of antenna processing;

DETAILED DESCRIPTION

Figure 2A:
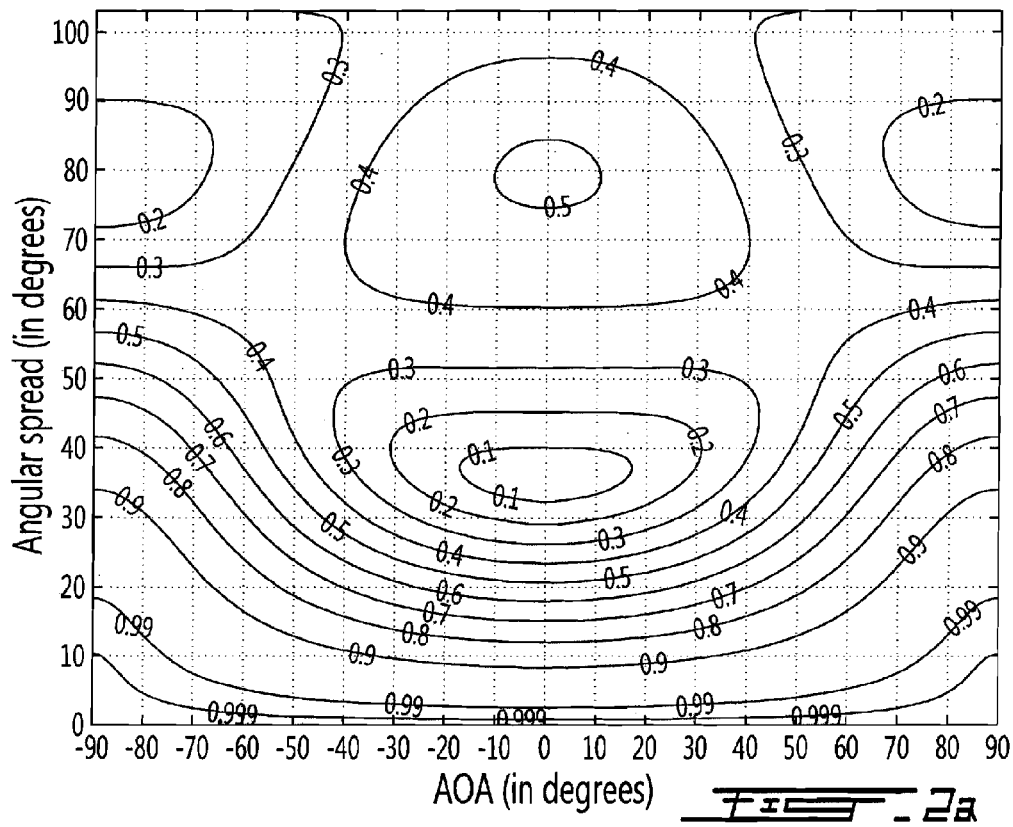
FIGS. 2(a and b) are representations of channel correlation magnitudes and phases as a function of mean angle of arrival, and of angular spread, for a uniform angular distribution.
Figure 2B:
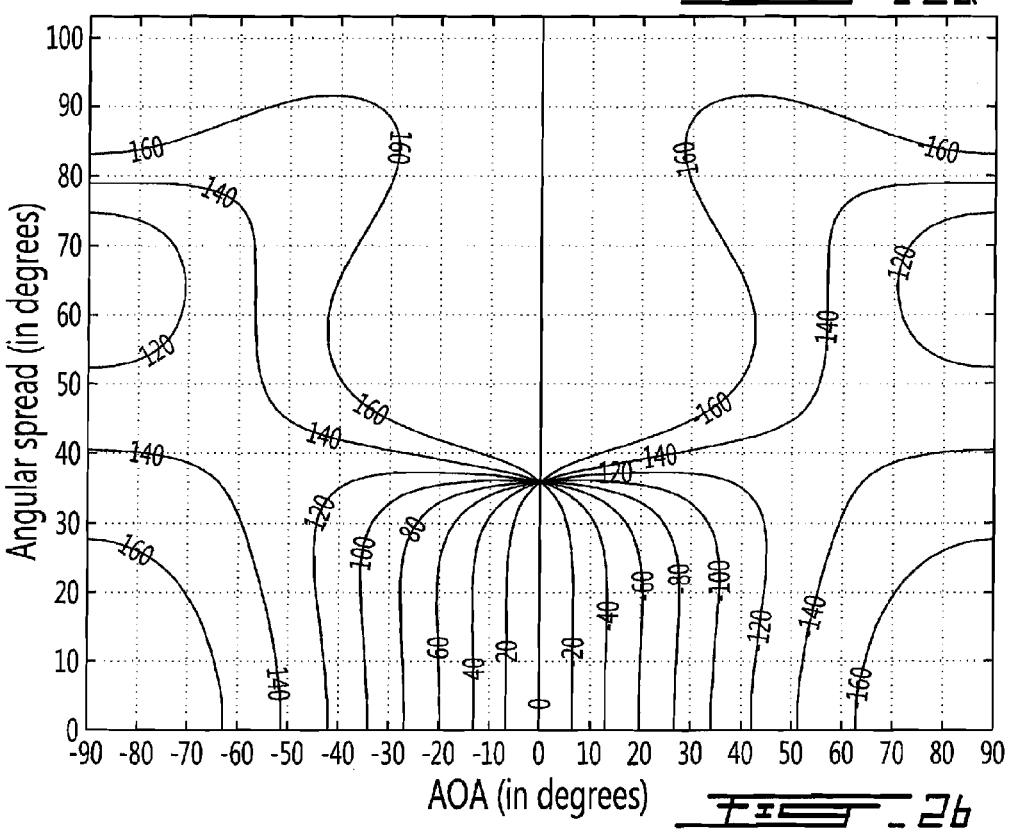
Figure 3A:
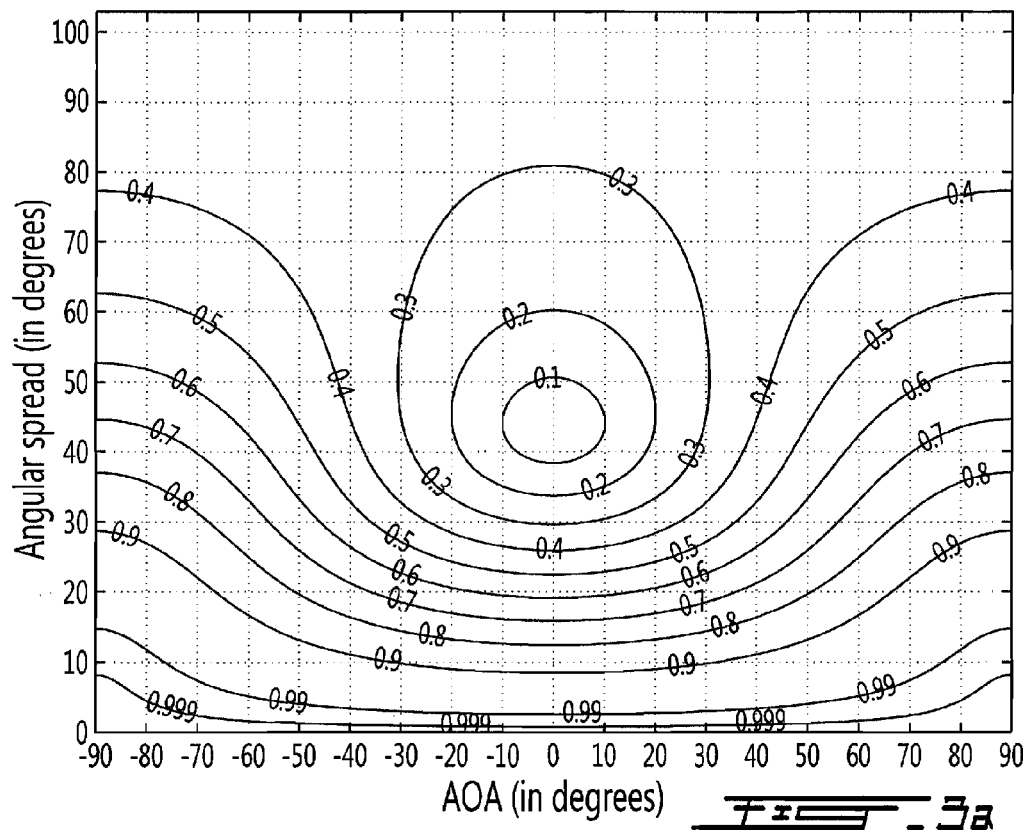
FIGS. 3(*a* and *b*) are representations of channel correlation magnitudes and phases as a function of mean angle of arrival, and of angular spread, for a Gaussian angular distribution.
Figure 3B:
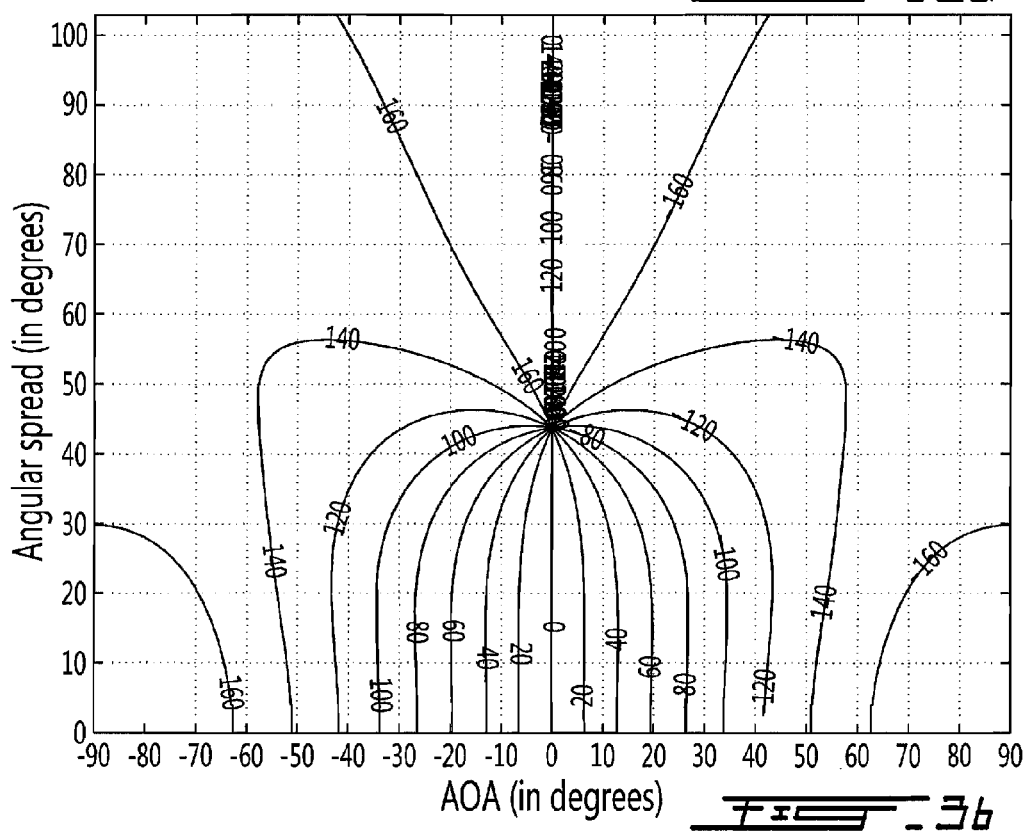
Figure 4A:
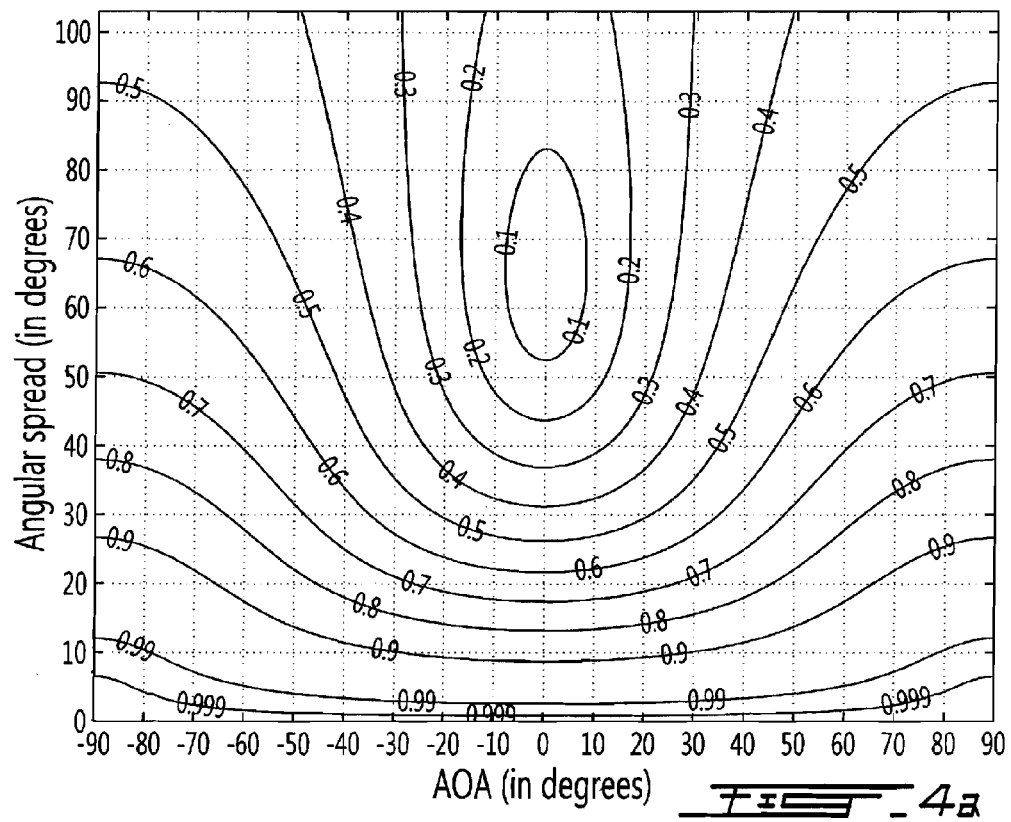
FIGS. 4(*a* and *b*) are representations of channel correlation magnitudes and phases as a function of mean angle of arrival, and of angular spread, for a Laplacian angular distribution.
Figure 4B:
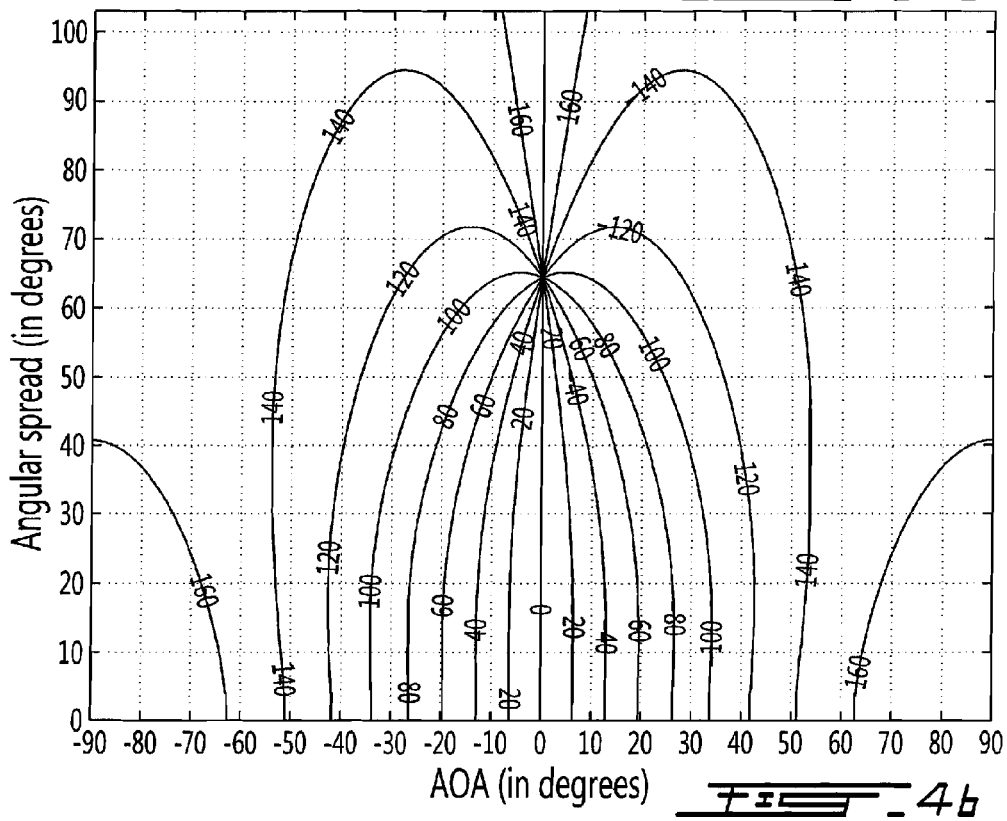

The innovative teachings of the present invention will be described with particular reference to various exemplary uses and aspects of the preferred embodiments. However, it should be understood that these embodiments provide only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and an antenna array system taking advantage of mathematical models to provide knowledge of characteristics of radio channels to improve the use of antenna arrays. These mathematical models, for various types of radio channels, characterized by the manner in which the channels may disperse and scatter radio signals, and for various types of angular parameters, are used to provide pre-calculated data stored in tables, also called Look Up Tables (LUT). By way of a non-limiting example, a LUT may comprise a mapping of angular spreads (AS) as a function of a magnitude and of a phase of a correlation of a signal received at a pair of antennas, for a Gaussian distribution type. Antenna array systems that are used to process raw information obtained by use of antenna elements take advantage of data in the tables to run low-complexity calculations.

Reference is now made to the drawings wherein FIG. 1 shows two antenna elements 105 and 110 of an antenna array 100, separated by a distance D. A signal emitted from a source, for example a mobile terminal, has a baseband component x of a narrow bandwidth, which has been modulated at a radio frequency. A complex multipath correlation $R_t$ between the baseband equivalents of narrowband signals $x_1$ and $x_2$ impinging at the two antenna elements 105 and 110 of the antenna array 100, at a receiver, is defined by equation (1):

$$R_t = E[x_1 x_2^*] \quad (1)$$

Wherein:

E[·] denotes the mathematical expectation;

·* denotes the complex conjugate.

the same complex multipath correlation $R_t$ is modeled by equation (2):

$$R_t = P \int_{\theta_m + \pi}^{\theta_m + \pi} f(\theta, \theta_m, \sigma) \exp\left[-j2\pi D \frac{f}{c} \sin\theta\right] d\theta \quad (2)$$

Wherein:

P is a power of the received signal;

$f(\theta, \theta_m, \sigma)$ is a power density function with respect to an azimuth angle of arrival (AOA)θ, the power density function depending on parameters $\theta_m$ which represents a mean azimuth angle, and σ which is an associated standard deviation, or angular spread (AS);

f is a carrier frequency of the received signal;

c is the speed of light;

D is an inter-element spacing representative of a distance between the two antenna elements 105 and 110.

Typical power density function to consider include:

The uniform distribution (defined for $$\left(\text{defined for } \sigma \leq \frac{\pi}{\sqrt{3}}\right):$$

$$f(\theta, \theta_m \sigma) = \begin{cases} \frac{1}{2\sqrt{3\sigma}}, & -\sqrt{3\sigma} \leq \theta - \theta_m \leq \sqrt{3\sigma} \\ 0, & \text{Otherwise.} \end{cases} \quad (3)$$

The truncated Gaussian (generally referred to simply as "Gaussian") distribution:

$$f(\theta, \theta_m, \sigma) = \begin{cases} \dfrac{\exp\dfrac{-(\theta - \theta_m)^2}{2\sigma^2}}{\int_{-\pi}^{\pi} \exp\dfrac{-\theta^2}{2\sigma^2} d\theta}, & -\pi < \theta - \theta_m \leq \pi \\ 0, & \text{Otherwise} \end{cases} \quad (4)$$

The truncated Laplacian (generally referred to simply as "Laplacian") distribution:

$$f(\theta, \theta_m, \sigma) = \begin{cases} \dfrac{\exp\dfrac{-\sqrt{2}|\theta - \theta_m|}{\sigma}}{\int_{-\pi}^{\pi} \exp\dfrac{-\sqrt{2}|\theta|}{\sigma} d\theta}, & -\pi < \theta - \theta_m \leq \pi \\ 0, & \text{Otherwise} \end{cases} \quad (5)$$

By putting equations (3), (4) or (5) in (2), assuming a small angular standard deviation, or AS, σ, sin θ in equation (2) can be linearized around $\theta_m$ in the way shown at equation (6):

$$\sin\theta = \sin\theta_m + (\theta - \theta_m)\cos\theta_m \quad (6)$$

Using equation (6) and equation (3) in equation (2), the Uniform angular distribution is given by equation (7):

$$R_t = P\int_{\theta_m-\sqrt{3}\sigma}^{\theta_m+\sqrt{3}\sigma} \frac{1}{2\sqrt{3}\sigma}\exp\left[-j2\pi D\frac{f}{c}\sin\theta\right]d\theta \quad (7)$$

In a similar way, the Gaussian angular distribution is given by equation (8):

$$R_t = P\int_{-\infty}^{\infty} \frac{1}{2\pi\sigma}\exp\left(\frac{-(\theta-\theta_m)^2}{2\sigma^2}\right)\exp\left[-j2\pi\frac{D}{\lambda}\sin\theta\right]d\theta \quad (8)$$

Wherein:
λ is a wavelength of the signal.

Finally, still in a similar way, the Laplacian distribution curve is provided by equation (9).

$$R_t = P\int_{-\infty}^{\infty} \frac{1}{\sqrt{2}\sigma}\exp\left(\frac{-\sqrt{2}}{\sigma}|\theta-\theta_m|\right)\exp\left[-j2\pi D\frac{f}{c}\sin\theta\right]d\theta \quad (9)$$

For all complex multipath correlation calculations above, a normalized multipath correlation is obtained by use of equation (10):

$$R = \frac{R_t}{P} \quad (10)$$

The notation of equation (11) is used in obtaining channel correlation coefficients R for populating one LUT for each of the aforementioned angular distribution type:

$$R = |R|\exp(\theta_R) \quad (11)$$

Wherein:
|R| is a correlation coefficient, representing a normalized magnitude of a multipath correlation between the two antenna elements 105 and 110 of FIG. 1, as calculated by equations (7), (8) and (9); and $\exp(\theta_R)$ is a correlation coefficient, representing a phase of the multipath correlation between the two antenna elements 105 and 110 of FIG. 1, as calculated by equations (7), (8) and (9).

FIGS. 2a, 2b, 3a, 3b, 4a and 4b show representations of channel correlation magnitudes, denoted "abs(R)", and phases, denoted "angle (R)", as a function of mean AOA and of AS, for the Uniform, Gaussian, and Laplacian angular distributions, respectively. These figures are obtained by applying a variety of AOAs and ASs in equations (7), (8) and (9). In FIGS. 2a, 2b, 3a, 3b, 4a and 4b, the antenna elements 105 and 110 have a spacing, or distance D, equal to a half wavelength. Similar patterns could be obtained for other distances D, using the same equations.

FIGS. 5a, 5b, 6a, 6b, 7a and 7b are representations of mean AOA and AS as a function of channel correlation magnitudes and phases, for the Uniform, Gaussian, and Laplacian angular distributions, respectively. These figures are also obtained by applying a variety of AOAs and ASs in equations (7), (8) and (9). The data as shown in FIGS. 5a, 5b, 6a, 6b, 7a and 7b is used to populate a LUT for each of the Uniform, Gaussian, and Laplacian angular distribution types. As an example, if the channel is known to have a Uniform angular distribution and if the measured channel correlation has a magnitude of 0.8 and a phase of −30 degrees, referring to FIG. 5a indicates that the mean AOA is +10 degrees from normal, as shown at point 510. For the same channel correlation magnitude and phase, point 520 on FIG. 5b indicates that the AS is between +10 and +15 degrees. A simple way to populate the LUTs is to use a computer to program equations (7), (8) and (9) representing the angular distribution types, enter in the equations suitable ranges for the AOA and for the AS, obtain the correlations from the equations, and store, for each equation, two LUTs providing (i) the mean AOA and (ii) the AS, as a function of the magnitude and phase of the equation results.

Other mathematical models, besides those introduced above, could also be used to populate LUTs providing angular parameters as a function of the correlation of the signal received on the antenna elements. Simpler models, including models not based on a specific angular distribution type, might be easier to implement, while providing a lesser accuracy of the angular parameters. Other parameters, besides angular parameters such as AOA and AS, could also be stored in the LUTs as a function of the correlation of the signal. The mathematical models presented hereinabove represent the best mode of the invention.

Figure 8:
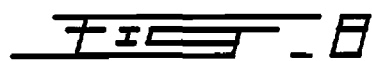
FIG. 8 shows a simplified data structure of a look-up table.

FIG. 8 shows a simplified data structure of a LUT 800 according to an embodiment of the present invention. The LUT 800 is a two-dimensional (2D) table. A first dimension 810 of the LUT 800 comprises pointers corresponding to correlation magnitudes of a signal received at an antenna element. A second dimension 820 of the LUT 800 comprises pointers corresponding to correlation phases of the signal received at the antenna element. A content 830 of the LUT comprises exemplary ASs, in degrees; the content 830 being approximated from FIG. 6b, which represents AS as a function of correlation magnitude and phase for the Gaussian distribution. The content 830 is addressable by a pair of pointers comprising one correlation magnitude and one correlation phase.

By use of LUTs obtained from these calculations, an embodiment of method of the present invention can estimate a type of angular distribution of a signal, the type being, for example, Uniform, Gaussian or Laplacian. The method preferably uses an antenna array comprising at least 3 antenna elements in a nonlinear arrangement, as shown on FIG. 9. FIG. 9 shows generally at 900 an antenna array comprising 3 antenna elements 910, 920 and 930. Antenna elements 910 and 920 form a first pair of antenna elements, separated by a distance 940. Antenna elements 920 and 930 form a second pair, separated by a distance 950. Distances 940 and 950 both form an angle (p with a direction 960. The array normal 160 is not, as in the case of FIG. 1, normal to a distance between two antenna elements, but rather has a normal angle 970 with the direction 960. The main, general direction of propagation 130 signal has an AOA θ, relative to the array normal 160. The signal is further spread around the general AOA by an AS σ.

As can be readily seen from equations (7), (8) and (9), which are used to populate LUTs, the term D, representing the inter-element spacing, has a significant impact on the values stored in the LUTs. The distances 940 and 950, corresponding to D, are thus preferably equal, in the configuration of the antenna array 900 of FIG. 9. If, however, the two distances 940 and 950 are not equal, two distinct LUTs may be used to properly model the antenna array 900, for each angular distribution type, i.e. one LUT for the pair formed by antenna elements 910 and 920, wherein the distance 940 is selected as D in equations (7), (8) or (9), and another LUT for the pair formed by antenna elements 920 and 930, wherein the distance 950 is selected as D.

Figure 10A:
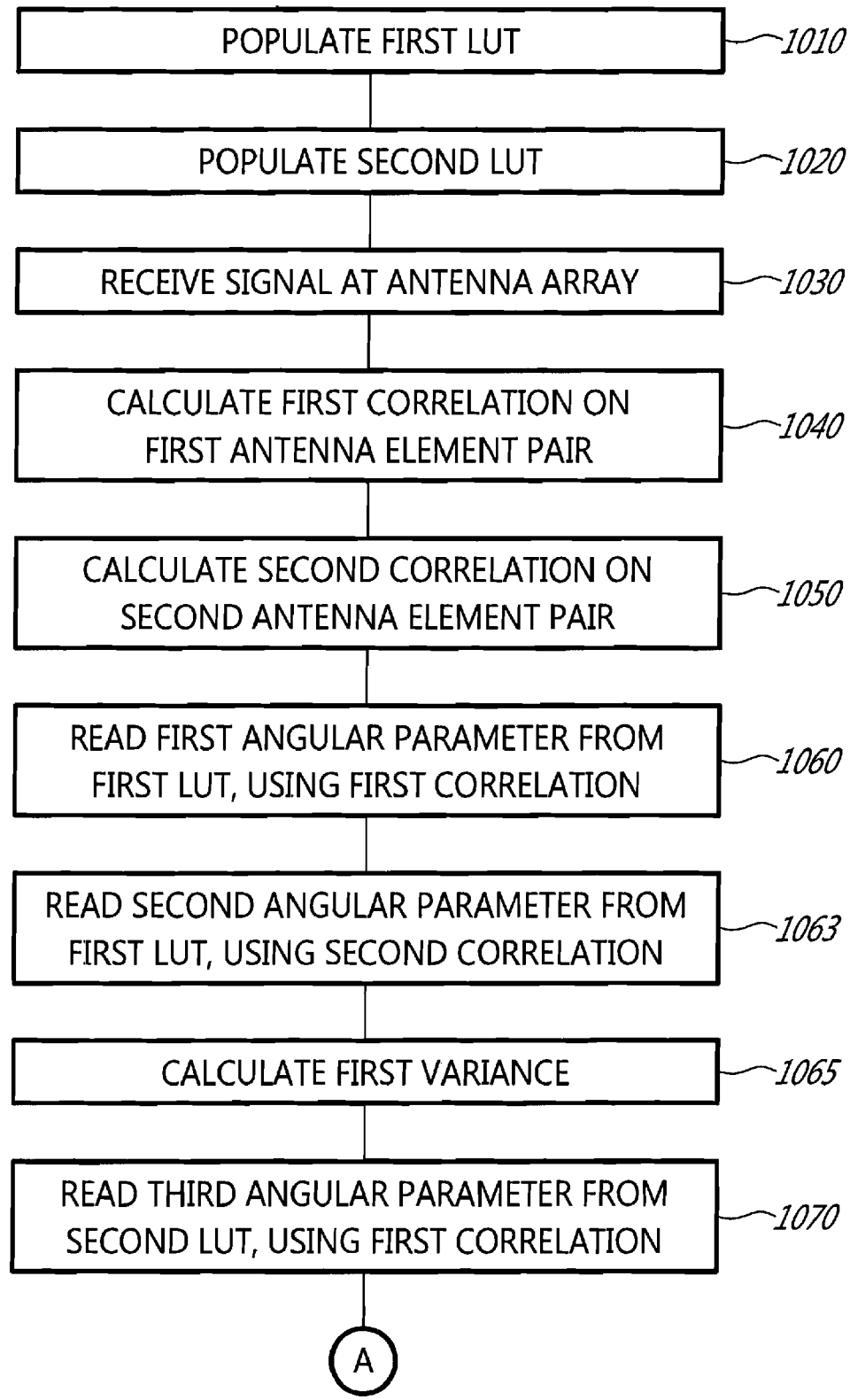
FIGS. 10(*a* and *b*) illustrate steps of a method to estimate a type of angular distribution.
Figure 10B:
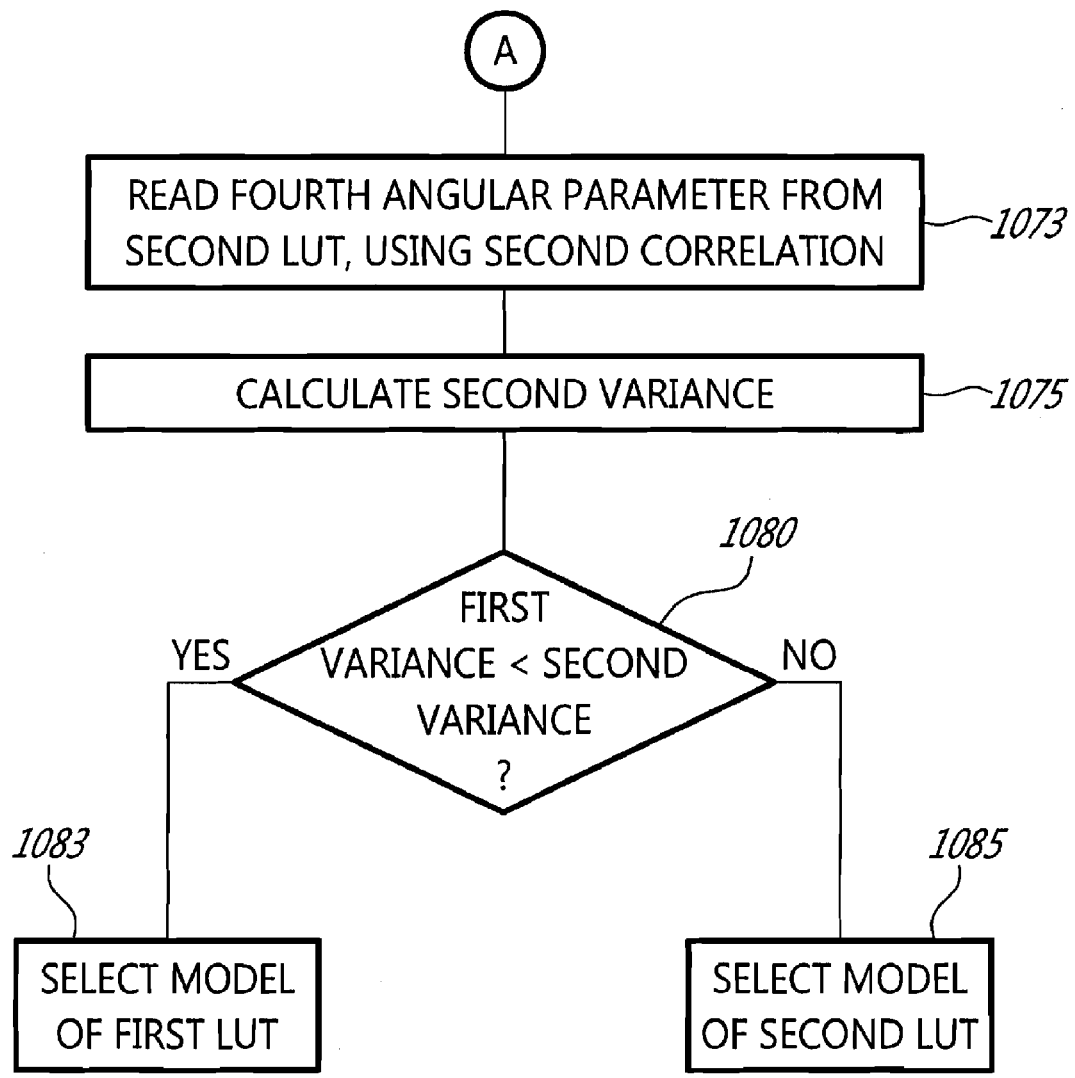

Having now described how LUTs may be populated with pre-calculated data for mapping angular parameters as a function of magnitudes and phases of signal correlations, reference is now made to FIGS. 10(*a* and *b*) which show steps of an exemplary method to estimate, as a parameter of a signal impinging on an antenna array, the type of angular distribution of the signal. In a first step, for a first angular distribution type, which could be for example Uniform, Gaussian or Laplacian, a first 2D LUT is populated at step 1010 with a mapping of angular parameters as a function of varying magnitude values and phase values of signal correlations. The angular parameters may comprise, for example, Angular Spread, mean Angle of Arrival, Median Angle of Arrival, and the like. Then, at step 1020, a second 2D LUT is filled with a similar mapping, for the same angular parameter type as that of the first 2D LUT, but this time for a second angular distribution type, different from the first angular distribution type. At step 1030, a signal impinging on an antenna array comprising at least three antenna elements in a nonlinear arrangement, such as for example the antenna array 900 of FIG. 9, is received. For two of these antenna elements, forming a first pair, a first correlation, sometimes also called cross-correlation, of the signal as perceived on the two antenna elements forming the first pair, is calculated at step 1040.

A high correlation indicates that the 2 antenna elements generally have a similar reception of the signal. Correlation procedures presented in hereinbelow rely on estimates of the complex channel correlation between antennas. The correlation between two channel coefficients $x_k$ and $x_l$ is defined as in equation (12):

$$R_{kl} = \frac{E[x_k x_l^*]}{\sqrt{E[|x_k|^2]E[|x_l|^2]}} \quad (12)$$

Where E[·] denotes the mathematical expectation, and [·]* denotes the complex conjugate. In practice, assuming ergodocity, that is the system will tend in probability to a limiting form that is independent of the initial conditions, estimation of the complex correlation is made by replacing the mathematical expectation by a time averaging operation. This results in equation (13):

$$R_{kl} \approx \frac{\sum_{i=0}^{N-1} x_k(i) x_l^*(i)}{\sqrt{\left[\sum_{i=0}^{N-1} |x_k(i)|^2\right] \cdot \left[\sum_{i=0}^{N-1} |x_l(i)|^2\right]}} \quad (13)$$

Furthermore, with a properly power calibrated antenna array system, the average power received at a given antenna is essentially the same for all antenna elements. That fact is exploited to obtain a more precise power estimate by replacing the power averaging over time for specific antennas by a power averaging over time and antennas. For example, for a total of $$\frac{1}{N_a}$$

antennas, equation (13) is replaced by equation (14):

$$R_{kl} \approx \frac{\sum_{i=0}^{N-1} x_k(i) x_l^*(i)}{\frac{1}{N_a} \sum_{j=0}^{N_a-1} \sum_{i=0}^{N-1} |x_j(i)|^2} \quad (14)$$

In practice, due to the space selective fading property of the channel, and to the fact that the averaging process is conducted over a relatively small time interval, it is preferable for the accuracy of the correlation estimate to do the averaging, in the denominator part of equation (14), only over antenna elements for which the fading exhibits a relatively high spatial correlation, that is, over antenna elements that are closely spaced to antenna elements k or l, especially if the estimation of large ASs is to be supported.

The above equations (12), (13) and (14) for the correlation assume that the time varying channel coefficients $x_k(i)$ are known. In practice, only channel coefficient estimates $\hat{x}_k(i)$ are available.

An approach to reduce the impact of the estimation noise on the correlation estimate benefits from an assumption that the estimation noise is uncorrelated between antennas. Consideration of the numerator of equation (14), it is visible that an estimation noise relative contribution will tend to zero as an estimation window grows. Otherwise stated, an effect of the estimation noise on the numerator is inconsequential, as long as the observation interval is large enough. On the other hand, the impact of the estimation noise on the denominator of equation (14) can become much more serious. In fact, when estimation noise is present, the power estimation made at the denominator of equation (14) gives an estimate of the desired channel coefficient power plus an additive component associated with the estimation noise power. Such additive component would clearly impair an AS estimation procedure that rely on the magnitude of the correlation. In order to the reduce this contribution, the Parseval theorem is used to exploit the fact that the spectrum of an outdoor wireless channel coefficient theoretically has a finite width equal to a Doppler spread. The Parseval theorem states, per equation (15):

$$\sum_{i=0}^{N-1} |\hat{x}_k(i)|^2 = \frac{1}{N} \sum_{m=0}^{N-1} |\hat{X}_k(m)|^2 \quad (15)$$

Where equation (16) s the N-point Discrete Fourier Transform (DFT) of $\hat{x}_k(i)$.

$$\hat{X}_k(m) = \sum_{i=0}^{N-1} \hat{x}_k(i) \exp(-j2\pi mi/N) \quad (16)$$

Making use of the fact that the spectrum of the outdoor wireless channel coefficient theoretically has a finite width equal to the Doppler spread, a simple procedure is provided to estimate the Doppler spread and only add DFT coefficients that fall within the corresponding Doppler spectrum, thus rejecting all out-of-Doppler-spectrum estimation noise components. The simple Doppler spread estimation procedure goes as follow:

1) A magnitude squared of the N-point DFT of the channel coefficient estimates for the antenna elements of interest is computed. A result by the noisy Doppler spectrum estimate (one per antenna) is noted.
2) A sum of those noisy Doppler spectrum over all antenna of interest is computed, and noted as the noisy average Doppler spectrum estimate.
3) A threshold is set as the maximum of the noisy average Doppler spectrum estimate, over all frequency bins, divided by 10.
4) A minimum bin index is found for which the noisy average Doppler spectrum estimate is larger than the threshold. This index is denoted as $m_{min}$.
5) A maximum bin index for which the noisy average Doppler spectrum estimate is larger than the threshold is found, and denoted as $m_{max}$.
6) The Doppler spread estimate is simply considered as the frequency range corresponding to the interval going from $m_{min}$ to $m_{max}$.

Once the $m_{min}$ and $m_{max}$ indices are computed, the correlation is estimated using the equation (17):

$$R_{kl} \approx \frac{\sum_{i=0}^{N-1} \hat{x}_k(i)\hat{x}_l^*(i)}{\frac{1}{NN_a}\sum_{j=0}^{N_a-1}\sum_{m=m_{min}}^{m_{max}} |\hat{X}_j(m)|^2} \quad (17)$$

It is known a priori that the magnitude of the correlation cannot be greater than one. In preparing data for the 2D LUTs, the correlation magnitude estimates used in the various methods of the present invention are calculated as per equation (17) and set equal to one if the result is greater than one.

Other mathematical models, besides equation (17), could also be used to calculate the correlation of the signal received on the antenna elements. Simpler models might be easier to implement, while providing a lesser accuracy of the signal correlation. The mathematical model presented hereinabove represent the best mode of the invention.

Continuing at step 1050, a second correlation of the signal is calculated, but this time based on the signal as perceived by a second pair of antenna elements, consisting of a third antenna element not included in the first pair and any other antenna element. Referring back to FIG. 9, the first pair might comprise antenna elements 910 and 920, while the second pair might comprise antenna elements 920 and 930. Because the two pairs are placed in a nonlinear arrangement, the actual AOAs of the signal relative to each pair are different, leading to different signal correlation calculations between the two pairs. At step 1060, a first angular parameter is read from the first 2D LUT, using a magnitude and a phase of the first correlation. A second angular parameter is read from the same first 2D LUT, using the second correlation, at step 1063. Alternatively, if the distance between antenna elements forming the first pair is not the same as the distance between antenna elements forming the second pair, two distinct 2D LUTs need to be used, based on the same angular distribution type, but representing two distinct inter-element spacing. At step 1065, a first variance, based on the first and second angular parameters, is calculated as is well-known in the art.

In an alternate aspect of the exemplary method to estimate the type of angular distribution of signals impinging on an antenna array, the first variance could be substituted by another calculation type, also based on the first and second angular parameters, for example a standard deviation, or a maximum difference calculation of the first and second angular parameters, also providing an indication of how of how angular parameters vary. Hence, "variance" should be construed herein as any measure of the variability of angular parameters, and not necessarily as an average squared deviation of each angular parameter from its mean. In either aspects, if the first variance obtained in step 1065 is small, this is indicative that the first 2D LUT comprises a good model of the actual radio channel. At step 1070, a third angular parameter is read from the second 2D LUT, using the first correlation. A fourth angular parameter is read, also from the second 2D LUT, using the second correlation, at step 1073. At step 1075, a second variance, based on the third and fourth angular parameters, is calculated. At step 1080, the first and second variances are compared. If the first variance is smaller, the angular distribution type having been used to populate the first 2D LUT is selected as the best available model at step 1083. If the second variance is smaller, the second angular distribution type is selected at step 1085.

The process of FIGS. 10(*a* and *b*) could be enhanced in several ways. For example, three distinct 2D LUTs could be used for the Uniform, Laplacian and Gaussian angular distribution types. In such a case, the steps of calculating correlations, variances, and comparing variances, would be repeated until a best channel model is found. Alternatively, other types of angular distribution, besides Uniform, Laplacian, or Gaussian, may be used. Also, more than three antenna elements could be used. In this way, more than two pairs of antenna elements would be used to implement the steps of calculating correlations. Variances would then be calculated on larger numbers of correlations, based on more antenna elements forming a larger number of pairs, further bolstering the confidence provided by comparison of the variances.

Another exemplary method, based on the same inventive concept, is provided for estimating an angular parameter, for example an AS, or a mean AOA, by use of an antenna array comprising at least 2 antenna elements, as illustrated in FIG. 11. The method assumes that the angular distribution type be known, or at least estimated, for example by use of the aforementioned method of FIGS. 10(*a* and *b*). Alternatively, a generic model, independent of the angular distribution type, may be used. At step 1110, a 2D LUT stores, for the relevant angular distribution type, values of the angular parameter as a function of a magnitude and of a phase of a correlation of a signal received at the antennas. The method measures a correlation of the signal between the 2 antenna elements, at step 1120, in the same manner as described hereinabove. A magnitude and a phase of the correlation are used as pointers to obtain, from the table, the desired angular parameter at step 1140. By way of a non-limiting example, assuming the known angular distribution type is Gaussian, if the magnitude of the correlation is 0.8 and the phase of the correlation is 90 degrees, the desired angular parameter may be an AOA of −30 degrees, as shown on FIG. 6*a* at point 610, or the desired angular parameter may be an AS of +15 degrees, as shown on FIG. 6*b* at point 620.

FIG. 12 shows a exemplary method, based on the same inventive concept, for selecting a type of antenna processing for a signal impinging on an antenna array comprising at least 2 antenna elements. The method assumes that the angular distribution type be known, or at least estimated, for example by use of the method of FIGS. 10(*a* and *b*). Alternatively, a generic model, independent of the angular distribution type, may be used. The method is based on a principle that some antenna processing types are only suitable when some angular parameters are within a given range. By way of an example, beamforming is an efficient reception method when the angular spread is small. At step 1210, a 2D LUT stores, for the relevant angular distribution type, values of the angular parameter as a function of a magnitude and of a phase of a correlation of a signal received at the antennas. The method measures a correlation of the signal between the 2 antenna elements, at step 1220, in the same manner as described hereinabove. A magnitude and a phase of the correlation are calculated at step 1230. The magnitude and the phase are used as pointers to obtain, from the table, the desired angular parameter at step 1240. The angular parameter obtained in this manner is compared to a predefined range at step 1250. If the angular parameter is within the predefined range, a first antenna processing system is selected at step 1260. If the angular parameter is not within the predefined range, a second antenna processing system is selected at step 1270. By way of a non-limiting example, the angular parameter obtained at step 1240 is an AS. If the AS obtained from the 2D LUT is found at step 1250 to be within a predefined range, for example less than +10 degrees, an antenna array processing type is selected at step 1260, for example beamforming. The angular parameter may be of another nature besides AS, and the predefined range of the angular parameter is not limited to being smaller than a given number. For example, an AOA that is substantially normal to a plane formed by 2 antenna elements, within a few degrees from normal, might indicate that using a third antenna element forming another plane with any of those 2 antenna elements, would not provide any better reception.

Figure 13:
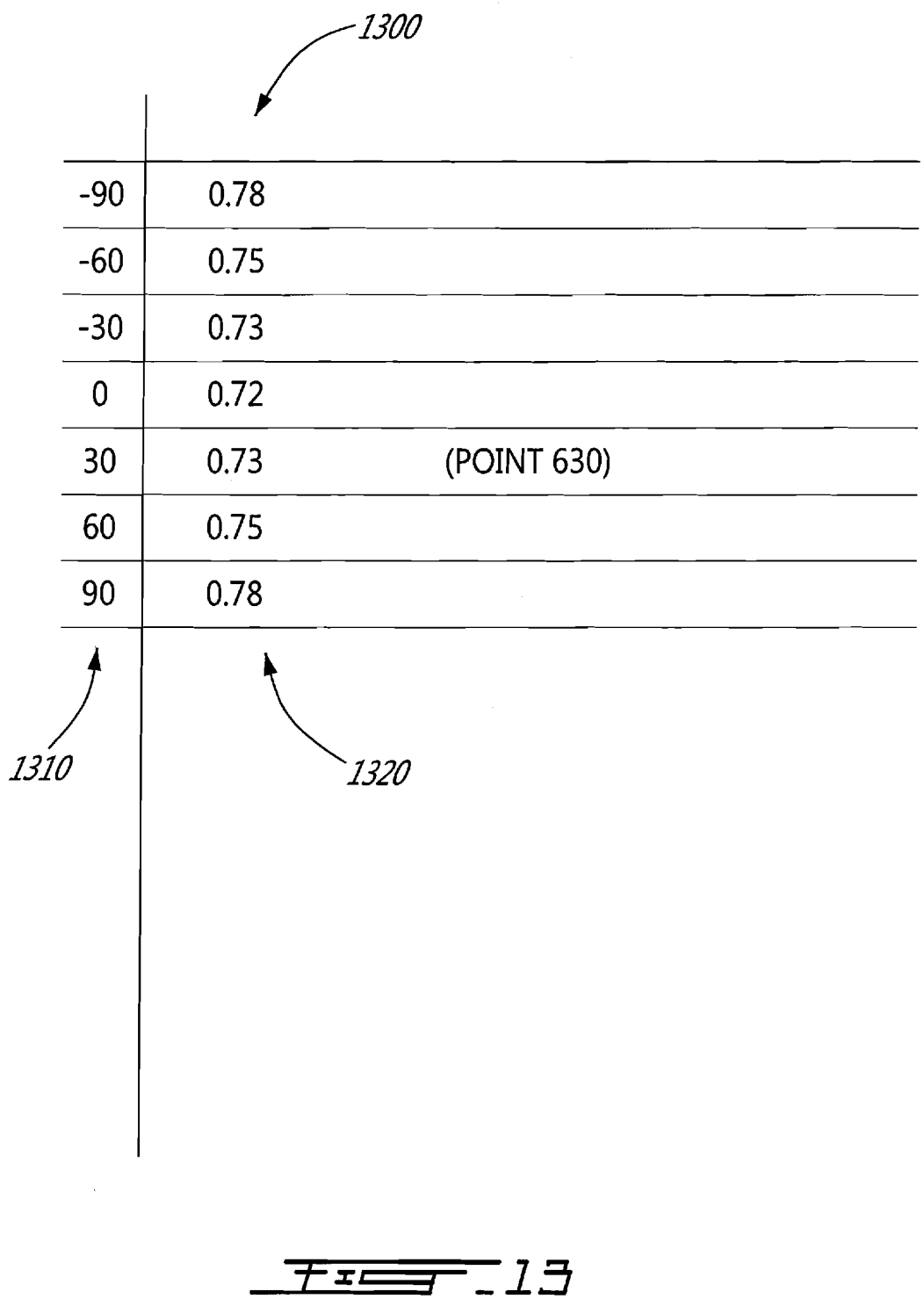
FIG. 13 shows a simplified data structure of a unidimensional look-up table.

Estimating a parameter of a signal can also be made by use of an unidimensional LUT, as may be seen in the following exemplary variant of the method of FIG. 12, provided for detecting a large AS and, in turn, for selecting a type of antenna processing, for a signal impinging on an antenna array comprising at least 2 antenna elements. The method assumes that the angular distribution type be known, or at least estimated, for example by use of the aforementioned method. Alternatively, a generic model, independent of the angular distribution type, may be used. In this exemplary variant, a user or designer of the antenna array system selects a maximum AS suitable for beamforming, for example 15 degrees. For this maximum angular parameter and for the relevant angular distribution type, a simpler, unidimensional LUT stores minimum magnitude values of the correlation of a signal received at the antennas as a function of a phase of the correlation. FIG. 13 shows a simplified data structure of the unidimensional LUT 1300 according to an exemplary implementation of the present invention. An array 1310 of the unidimensional LUT comprises pointers corresponding to correlation phases of a signal received at a pair of antenna elements. A content 1320 of the unidimensional LUT, addressable by the pointers corresponding to correlation phases, comprises for example minimum magnitude values for the correlation of the signal, for the given correlation phase, corresponding to the selected maximum AS suitable for beamforming. Other parameter values could also form the content of 1320 of the unidimensional LUT. In any case, the unidimensional LUT of this method is significantly smaller than the LUT introduced in the aforementioned methods because it is only addressable by correlation phase, rather than by correlation phase and correlation magnitude. Hence, the storage space of the unidimensional LUT is lower and its operation uses even less calculation capacity. The exemplary method, wherein the content 1320 consists of minimum magnitude values for the correlation of the signal, measures a correlation of the signal between the 2 antenna elements at step 1220. A magnitude and a phase of the correlation are calculated at step 1230. The correlation magnitude of the signal defines a range that is later used to select a type of antenna processing. The phase is used at step 1240 as pointer to obtain, from the unidimensional LUT, the relevant parameter consisting of a minimum magnitude for the correlation. If, at step 1250, the minimum magnitude obtained from the table is smaller than the measured signal correlation magnitude, the parameter is within range and the AS of the signal is considered small, as it is smaller than the +15 degrees figure selected by the user or designer of the antenna array. A first type of antenna processing is selected at step 1260, preferably beamforming. If, alternatively, the minimum magnitude read from the table is larger than the measured magnitude, the parameter is out of range and the AS of the signal is considered large. A second type of antenna processing, preferably different from beamforming, is selected at step 1270. An illustration of the method may be made by reference to FIGS. 6*b* and 13, assuming a Gaussian angular distribution type. The unidimensional LUT comprises a mapping of the curve marked referring to an AS of 15 degrees. If the phase of the correlation of the signal is of +30 degrees, the table shows that the minimum magnitude of the correlation must be about 0.73, as shown at point 630 on both FIGS. 6*b* and 13. If the measured magnitude of the correlation is superior to 0.73, this is indicative that the AS is smaller than +15 degrees, a consequence of this being that the signal is heavily correlated between the two antennas. Beamforming is in this case a suitable antenna processing system for the signal.

A further variant of the exemplary method of FIG. 11 is provided for estimating an angular parameter, for example an AS, or a mean AOA, of a signal impinging on an antenna array comprising at least 2 antenna elements. The method does not rely on any a priori knowledge of the angular distribution type. A 2D LUT stores a worst-case of the angular parameter according to any one of several possible angular distribution types. Considering for example an AS of +10 degrees. By reference to FIGS. 5*b*, 6*b* and 7*b*, it can be seen that, for example, when the phase of the correlation is between either −30 degrees or +30 degrees on the horizontal axis, the AS is about 10 degrees if the magnitude of the correlation is equal to 0.86 (Uniform distribution, FIG. 5*b* at 530), or 0.87 (Gaussian distribution, FIG. 6*b* at 640), or 0.88 (Laplacian distribution, FIG. 7*b* at 710). Thus, given that the angular distribution type is unknown, the highest magnitude of the correlation for a correlation phase of +/−30 degrees is 0.88 for an AS of +10 degrees, as provided by the Laplacian-based curve of FIG. 7*b*. The 2D LUT of FIG. 8 may be filled, with ASs as the content 830, with data calculated in this manner, wherein a correlation phase of +/−30 degrees and a correlation magnitude of 0.88, used as pointers, point to an AS of +10 degrees. Once the 2D LUT has been filled with data according to this aspect of the present invention, an angular parameter of the signal impinging on the antenna array may be evaluated, using the steps of FIG. 11.

Figure 5A:
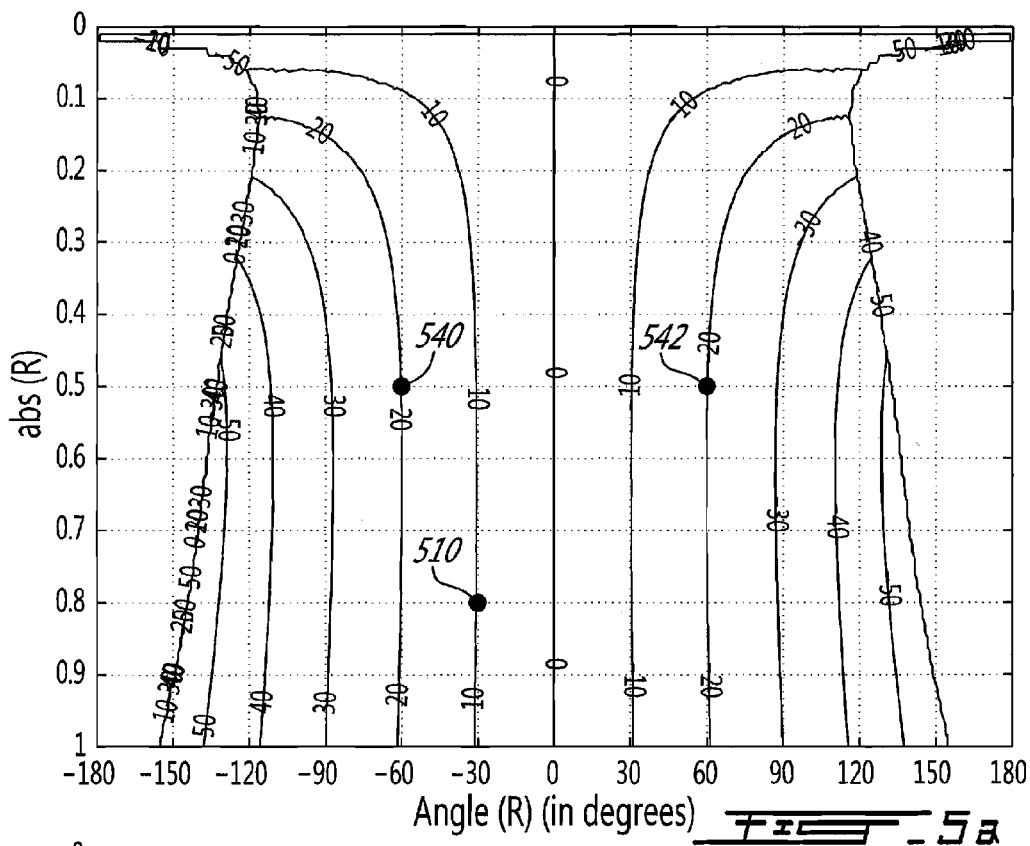
FIGS. 5(*a* and *b*) are representations of mean angle of arrival, and angular spread, as a function of channel correlation magnitudes and phases, for a uniform angular distribution.
Figure 5B:
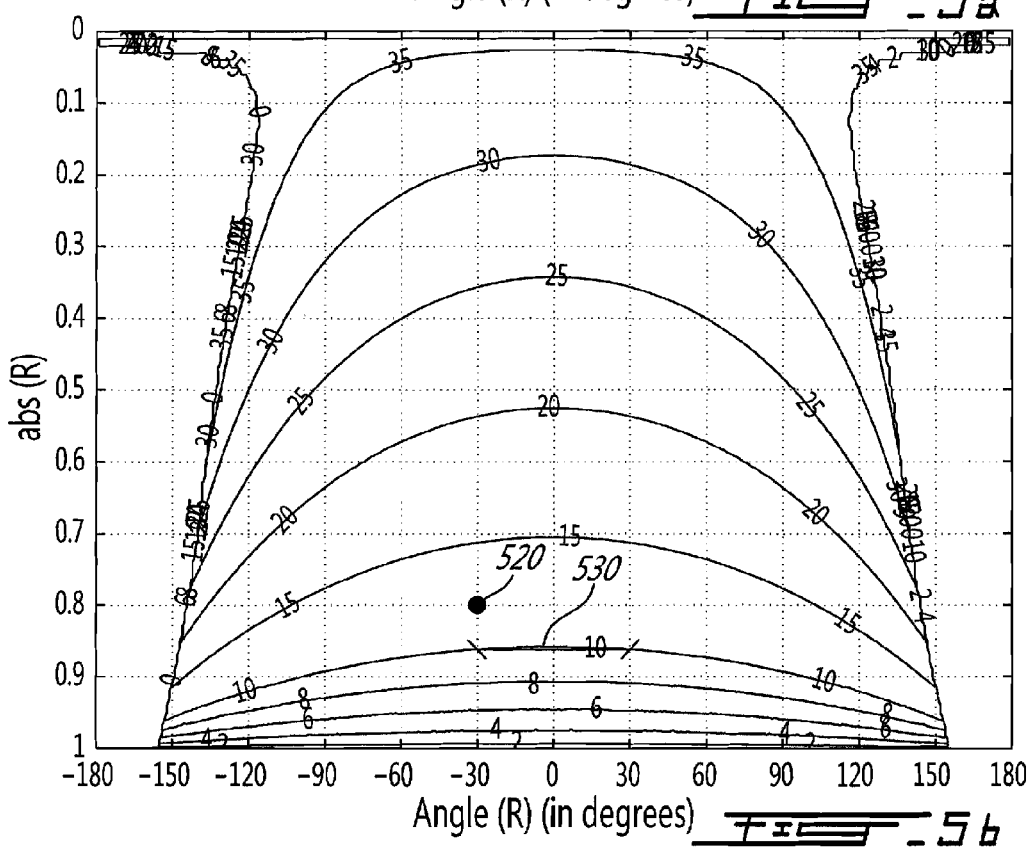
Figure 7A:
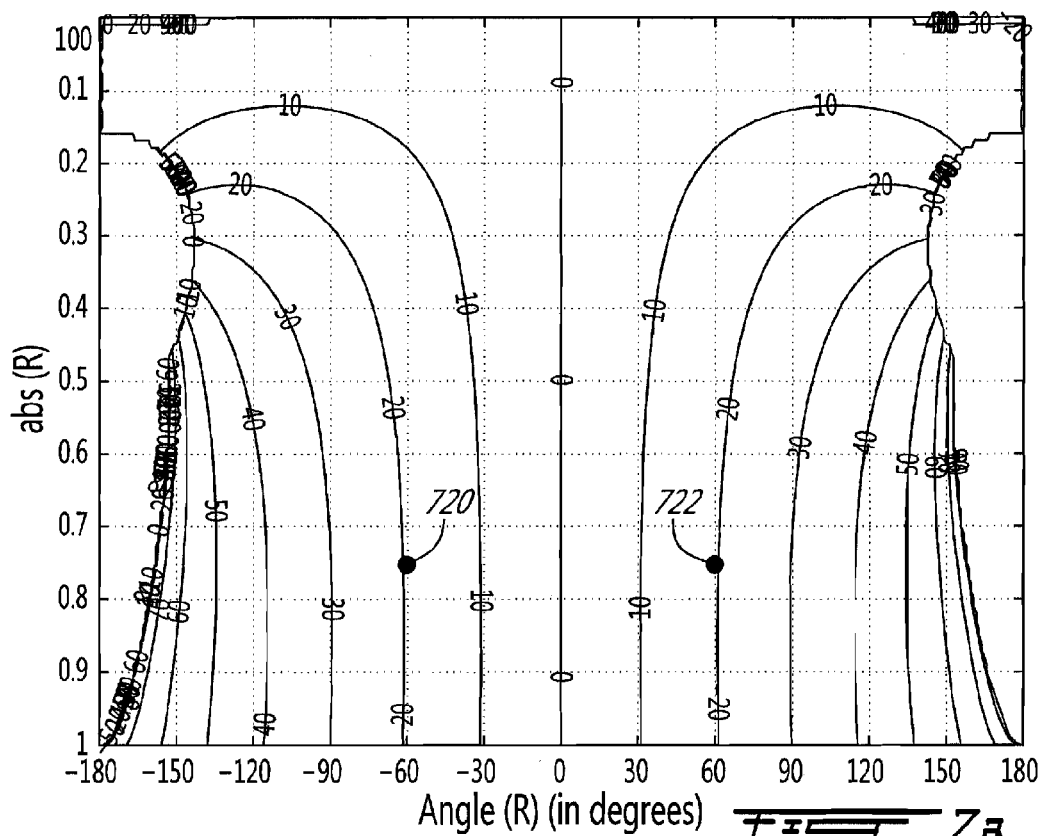
FIGS. 7(*a* and *b*) are representations of mean angle of arrival, and angular spread, as a function of channel correlation magnitudes and phases, for a Laplacian angular distribution.
Figure 7B:
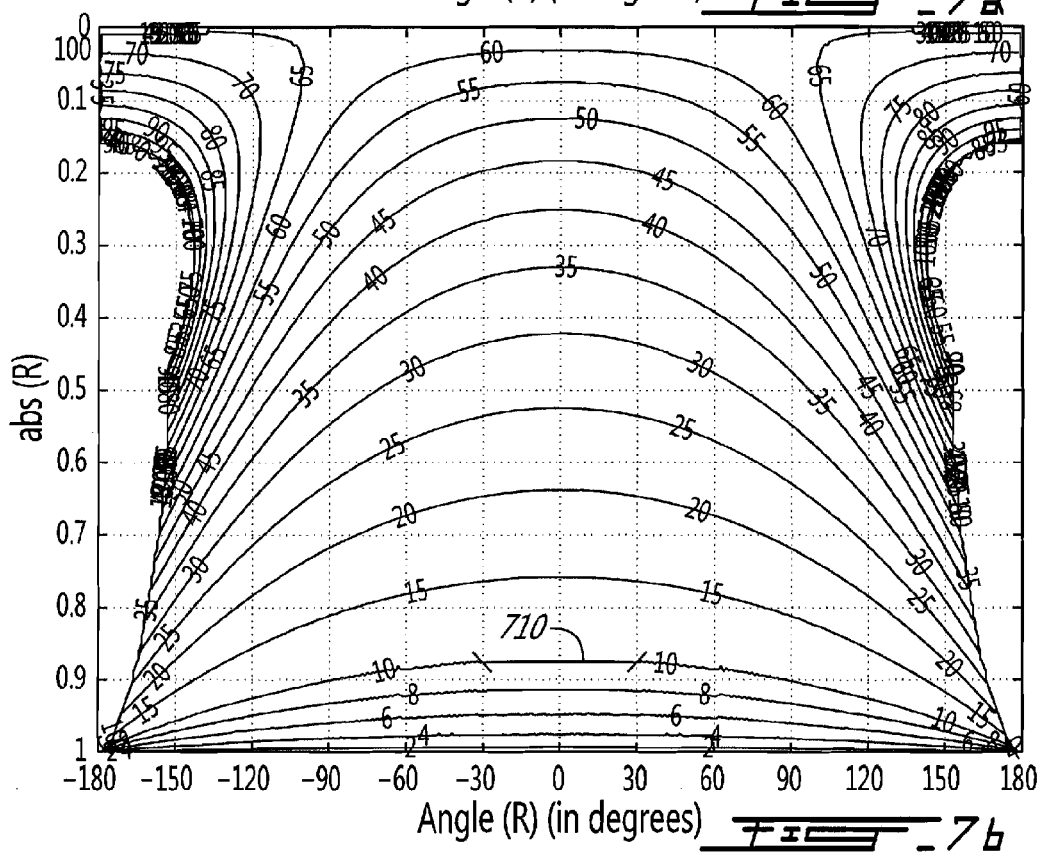

If, in another example, the designer of the antenna array system desires that the AOA be within a pre-determined limit, the table may be populated with data from FIGS. 5*a*, 6*a* and 7*a*. For an AOA within a range of +/−20 degrees from normal and for a phase of the correlation between −60 and +60 degrees, FIG. 5*a* shows that, for a Uniform distribution, the magnitude of the correlation must be of at least 0.50 (points 540 and 542). FIG. 6*a*, for the Gaussian distribution, sets the limit to a minimum of about 0.60 (points 650 and 652). FIG. 7a, for the Laplacian distribution, sets the limit to a minimum of about 0.73 (points 720 and 722). As a result, given that the angular distribution type is unknown, the worst-case minimum of the magnitude of the correlation for a correlation phase between −60 degrees and +60 degrees is 0.73 for an AOA between +/−20 degrees, as provided by the Laplacian-based curve of FIG. 7a. Once the 2D LUT has been filled with data according to this aspect of the present invention, a type of antenna processing may be selected, using the steps of FIG. 12.

Figure 14:
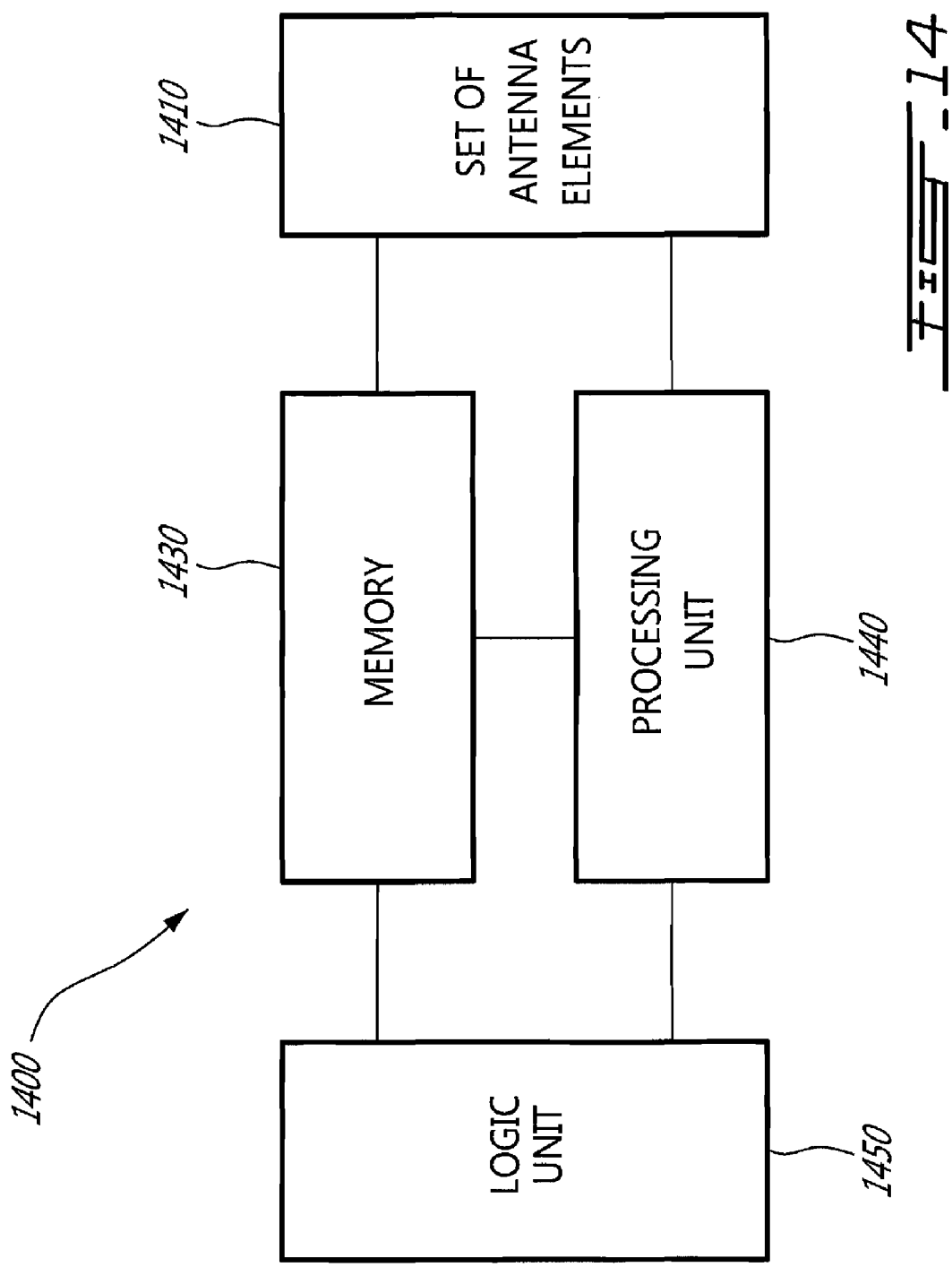
FIG. 14 shows an exemplary construction of an antenna array system.

An exemplary construction of an antenna array system, used in the exemplary methods presented hereinabove, will now be described by reference to FIG. 14. An antenna array system 1400 comprises a set of antenna elements 1410, which may for example be identical to the antenna array 900 of FIG. 9, a processing unit 1440, a memory 1430 and a logic unit 1450. Generally, the antenna array system 1400 would also comprise other components (not shown) for communication with a receiver, for example in a radio base station, as well as power supplies, and other well-known components.

The processing unit 1440 runs equations (7), (8) and (9) to calculate values that populate LUTs, thereby defining relations between correlation phase values and parameter values, for storing in unidimensional LUTs and in a first dimension of 2D LUTs. The processing unit 1440 may also run equations (7), (8), and (9) for further defining relations between correlation magnitude values and parameter values for storing in a second dimension of 2D LUTs. Parameter values calculated for populating unidimensional LUTs may comprise, for example, minimum correlation magnitude values corresponding to a given AS. Parameter values calculated for populating 2D LUTs may comprise, for example, AS, mean AOA, and median AOA.

The content of the LUTs may alternatively be calculated by other means. The content of the LUTs may be calculated outside of the antenna array system 1400 and communicated to the memory 1430 by well-known means, including by use of a communication link between the antenna array system 1400 and a receiver (not shown). In another aspect, the content of the LUTs may be permanently stored, i.e. preprogrammed in a non-volatile part of the memory 1430.

The LUTs are stored in the memory 1430 and their contents are addressable by pointers consisting of correlation phases only for unidimensional LUTs, and of correlation phases and correlation magnitudes for 2D LUTs.

The processing unit 1440 also calculates correlation magnitude and phases of signals impinging on the antenna elements 1410, reads parameters, for example angular parameters, from the LUTs in the memory 1430 and calculates variances between angular parameters. The processing unit 1440 further executes the actual processing for the antenna array, for example beamforming or simple antenna diversity, as is well-known in the art.

The logic unit 1450 compares parameters obtained from the LUTs with predetermined figures, such as thresholds or predefined ranges, to determine which of possible antenna array processing types may be more suitable for receiving a signal. For example, an AS of less than +15 degrees, obtained from the LUTs, may indicate that beamforming is to be selected. In another example, an AOA falling in a range between −30 degrees and +30 degrees may indicate that simple antenna diversity, as opposed to multi-sector diversity, is suitable for the signal. In the case of an unidimensional LUT storing minimum correlation magnitude values as function of correlation phase values, the logic unit 1450 may compare the minimum correlation magnitude, read from the table by use of the signal correlation phase, with a signal correlation magnitude and make a selection of an antenna array processing type.

In an aspect of the construction of the antenna array system 1400 wherein the set of antenna elements 1410 comprises at least 3 antenna elements placed in a non-linear arrangement, the processing unit 1440 may further calculate relations between correlation phase and magnitude values and angular parameters for a first angular distribution type, thereby providing a content for a first 2D LUT stored in the memory 1430. The processing unit 1440 may also calculate similar relations for a second angular distribution type, providing a content for a second 2D LUT also stored in the memory 1430. The processing unit 1440 further calculates correlation magnitudes and phases for two or more pairs of antenna elements and addresses each of the two 2D LUTs with pointers corresponding to correlation magnitudes and phases for each of the two or more pairs, providing four or more parameters, for example angular parameters such as AS or AOA. The processing unit 1440 further calculates variances of resulting angular parameters based on each of the two angular distribution types. The logic unit 1450 compares the variances and selects the angular distribution type according to the smaller variance calculated by the processing unit.

Figure 15:
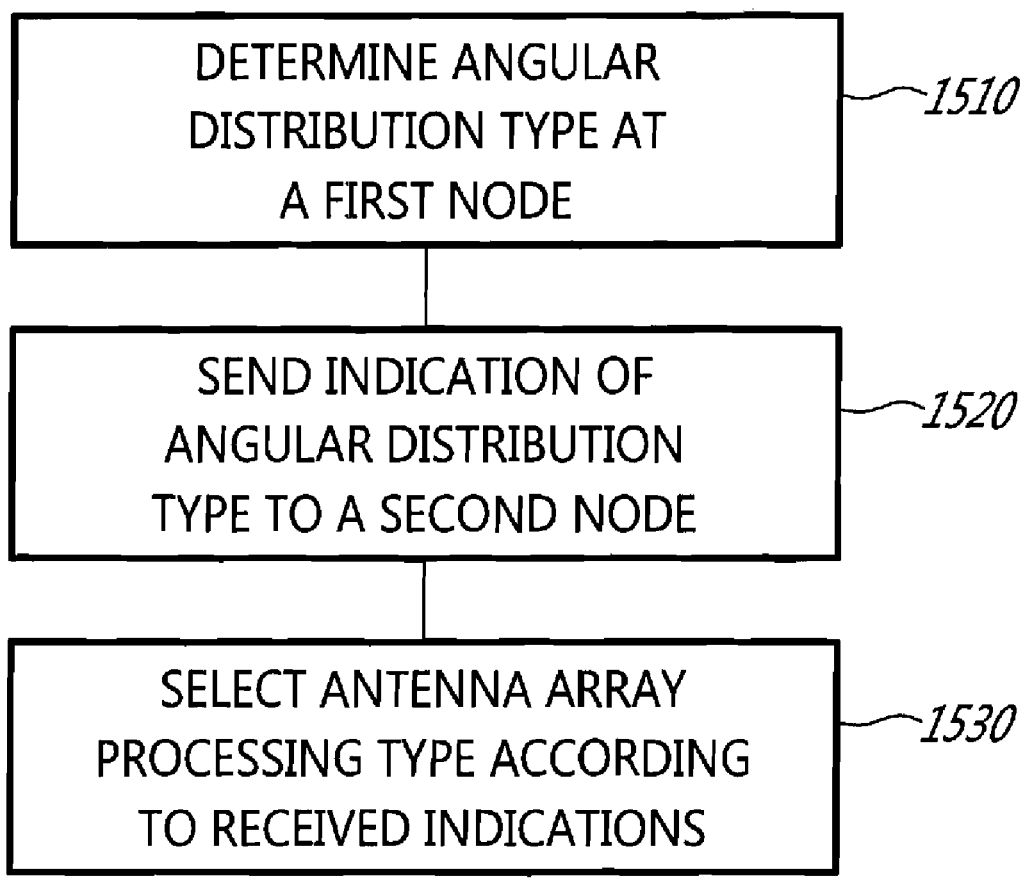
FIG. 15 illustrates a further process for selecting an antenna array processing type.

The antenna array system and the various embodiments of the method of the present invention may be implemented in a mobile terminal (MT), in a radio base station (RBS), sometimes simply called base station (BS), or in any system equipped for radio communication. Some adaptive antenna techniques, for example beamforming, or Multiple Input Multiple Output (MIMO), are advantageously used on the transmitting side. Knowledge of the angular distribution type of the radio channel, or knowledge of an angular parameter of the signal at a distant receiver, may be very useful for transmitters, as much as for receivers. FIG. 15 illustrates a further variant of the method for selecting an antenna array processing type that may be useful both for radio transmission and reception. Considering a case where the antenna system is implemented in a MT as a first node, the MT estimates the type of angular distribution of a radio signal it is receiving from a network, for example from a RBS as a second node, by use of the process of FIGS. 10(a and b), at 1510. The MT then sends to the network, that is to the RBS, at 1520, a message comprising an indication of the angular distribution type as perceived by the MT. Considering that scatterers in the channel may have a similar effect to radio transmission in either directions, that is from the RBS to the MT and vice-versa, the RBS may advantageously select, for transmission or for reception or for both, an antenna array processing type suitable for the angular distribution type as indicated by the MT, at 1530. Alternatively, the MT might send information to the network about an angular parameter it has estimated, for example to indicate that it perceives a small AS. As a result, the network may select to use beamforming for transmitting towards the MT. The network may also collect similar indications received from a plurality of MTs, and select an antenna array processing system corresponding to the most appropriate one for a majority of MTs. In FIG. 15, the first node might comprise an RBS, and the second node might comprise a network node such as a Base Station Controller (BSC), or any other network node. The RBS may send at 1520 to the BSC an indication of the angular distribution type it perceives at 1510, according to the method of FIGS. 10(a and b). The RBS may alternatively send information about an angular parameter it has estimated. The BSC may in turn collect such indications from one or from a plurality of RBSs and make a determination, for one, several, or all of the RBSs in the network, of an appropriate antenna array processing type at 1530.

Although several aspects of the preferred embodiments of the method and antenna array system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method of estimating an angular parameter of a signal arriving at an antenna array, the method comprising the steps of:
    storing in a first two-dimensional table values of said angular parameter as a function of correlation magnitude and phase values;
    storing in a second two-dimensional table, for a second angular distribution type, values of said angular parameter as a function of correlation magnitude values and of correlation phase values;
    calculating a first correlation phase and a first correlation magnitude of said signal between a first and a second antenna element of said antenna array, said first correlation phase being used as a first pointer for reading said parameter from said first two-dimensional table and said first correlation magnitude being used as a second pointer for reading a first angular parameter from said first two-dimensional table;
    calculating a second correlation phase and a second correlation magnitude of said signal between said second and a third antenna element of said antenna array;
    reading a second angular parameter from said first two-dimensional table, by use of said second correlation magnitude and of said second correlation phase;
    calculating a first variance of said first and second angular parameters;
    reading a third angular parameter from said second two-dimensional table, by use of said first correlation magnitude and of said first correlation phase;
    reading a fourth angular parameter from said second two-dimensional table, by use of said second correlation magnitude and of said second correlation phase;
    calculating a second variance of said third and fourth angular parameters; and
    selecting said first angular distribution type if said first variance is smaller than said second variance.

2. The method of claim 1, wherein:
said table comprises pre-calculated values.

3. The method of claim 1, wherein:
said values of said parameter are stored in said table for a known angular distribution type.

4. The method of claim 1, wherein:
said values of said parameter are stored in said table for a worst-case of possible angular distribution types.

5. The method of claim 1, wherein:
said first and said second antenna elements are spaced at one half of a wavelength of said signal.

6. The method of claim 1, wherein:
said angular parameter is selected from the group consisting of an angular spread, a mean angle of arrival, and a median angle of arrival.

7. The method of claim 1, further comprising the step of:
selecting a first antenna array processing type if said first angular parameter is within a predefined range.

8. The method of claim 1, wherein:
said antenna array is in a base station.

9. The method of claim 8, wherein:
said base station sends to a network node said angular distribution type.

10. The method of claim 9 wherein:
said network node receives said angular distribution type from one or more base stations; and
said network node selects an antenna array processing type according to said angular distribution type received from said one or more base stations.

11. The method of claim 1, wherein:
said antenna array is in a mobile terminal.

12. The method of claim 11, wherein:
said mobile terminal sends to a network said angular distribution type.

13. The method of claim 12, wherein:
said network receives said angular distribution type from one or more mobile terminals; and
said network selects an antenna array processing type according to said angular distribution type received from said one or more mobile terminals.

14. The method of claim 1, wherein:
said angular distribution type is selected from the group consisting of Laplacian, Gaussian, and Uniform.

15. The method of claim 1, wherein:
said antenna array is in a base station.

16. The method of claim 15, wherein:
said base station sends to a network node said first angular parameter.

17. The method of claim 16 wherein:
said network node receives angular parameters from one or more base stations; and
said network node selects an antenna array processing type according to angular parameters received from said one or more base stations.

18. The method of claim 1, wherein:
said antenna array is in a mobile terminal.

19. The method of claim 18, wherein:
said mobile terminal sends to a network said first angular parameter.

20. The method of claim 19, wherein:
said network receives angular parameters from one or more mobile terminals; and
said network selects an antenna array processing type according to said angular parameters received from said one or more mobile terminals.

21. The method of claim 1, wherein:
said parameter is a minimum correlation magnitude; and
said table stores said values of said minimum correlation magnitude as a function of said correlation phase values for a given angular spread.

22. The method of claim 21, wherein:
a first antenna array processing type is selected if a correlation magnitude calculated for said signal is larger than said minimum correlation magnitude.

23. The method of claim 21, wherein:

it is determined that an angular spread of said signal is large if a correlation magnitude calculated for said signal is larger than said minimum magnitude.

24. The method of claim 23, further comprising the steps of:

selecting a first antenna array processing type if said angular spread is large; and selecting a second antenna array processing type if said angular spread is not large.

25. The method of claim 21, further comprising the steps of:

said values of said minimum correlation magnitude are stored in said table for a given angular distribution type; and a first antenna array processing type is selected if a correlation magnitude calculated for said signal is larger than said minimum correlation magnitude.

\* \* \* \* \*

UNITED STATES PATENT AND TRADEMARK OFFICE
CERTIFICATE OF CORRECTION

| | | |
|---|---|---|
| PATENT NO. | : 8,095,185 B2 | Page 1 of 1 |
| APPLICATION NO. | : 11/449706 | |
| DATED | : January 10, 2012 | |
| INVENTOR(S) | : Stephenne | |

It is certified that error appears in the above-identified patent and that said Letters Patent is hereby corrected as shown below:

In Column 6, Line 32, delete "distribution (defined for" and insert -- distribution --, therefor.

In Column 8, Line 52, delete "(p" and insert -- φ --, therefor.

Signed and Sealed this
Tenth Day of July, 2012

David J. Kappos
*Director of the United States Patent and Trademark Office*